United States Patent
Raghothaman et al.

(10) Patent No.: US 10,045,386 B2
(45) Date of Patent: Aug. 7, 2018

(54) METHOD AND APPARATUS FOR DEVICE-TO-DEVICE (D2D) MOBILITY IN WIRELESS SYSTEMS

(71) Applicant: INTERDIGITAL PATENT HOLDINGS, INC., Wilmington (DE)

(72) Inventors: Balaji Raghothaman, Chester Springs, PA (US); Ravikumar V. Pragada, Collegeville, PA (US); Zhuorong Deng, Brooklyn, NY (US); Diana Pani, Montreal (CA); Ghyslain Pelletier, Laval (CA); Gwenael Poitau, Montreal (CA); Kiran K. Vanganuru, King of Prussia, PA (US); Gregory S. Sternberg, Mt. Laurel, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/906,055

(22) Filed: May 30, 2013

(65) Prior Publication Data
US 2013/0324114 A1 Dec. 5, 2013

Related U.S. Application Data

(60) Provisional application No. 61/653,643, filed on May 31, 2012, provisional application No. 61/818,182, filed on May 1, 2013.

(51) Int. Cl.
*H04W 76/02* (2009.01)
*H04W 8/00* (2009.01)
(Continued)

(52) U.S. Cl.
CPC ......... *H04W 76/023* (2013.01); *H04W 8/005* (2013.01); *H04W 36/0083* (2013.01); *H04W 76/027* (2013.01); *H04W 88/06* (2013.01)

(58) Field of Classification Search
CPC ........... H04W 72/082; H04W 72/0406; H04W 76/023; H04W 52/146; H04W 52/243;
(Continued)

(56) References Cited

U.S. PATENT DOCUMENTS 7,831,252 B2 * 11/2010 Shang et al. .................. 455/436
8,576,846 B2 11/2013 Kumar et al.
(Continued)

FOREIGN PATENT DOCUMENTS

| WO | 2007/055623 | 5/2007 |
| WO | 2011/146653 | 11/2011 |

(Continued)

OTHER PUBLICATIONS

Arm Security Technology, "Building a Secure System using TrustZone® Technology," pp. 1-108 (2009).
(Continued)

*Primary Examiner* — Qun Shen
(74) *Attorney, Agent, or Firm* — Volpe and Koenig, P.C.

(57) ABSTRACT

A wireless transmit/receive unit (WTRU) may receive discovery related configuration information that includes discovery filtering information and information for a non-long term evolution radio access technology (non-LTE RAT). The WTRU may monitor a device to device (D2D) communication interface on the non-LTE RAT based on the discovery filtering information and send a report that includes information associated with the discovery filtering information. The WTRU may receive a message to allow the WTRU to establish a D2D communication link with another WTRU using the non-LTE RAT.

12 Claims, 24 Drawing Sheets

(51) Int. Cl.
*H04W 36/00* (2009.01)
*H04W 88/06* (2009.01)

(58) Field of Classification Search
CPC ............. H04W 52/242; H04W 52/383; H04W 52/386; H04W 24/10
See application file for complete search history.

(56) References Cited

U.S. PATENT DOCUMENTS

| | | | |
|---|---|---|---|
| 8,605,625 B2 | 12/2013 | Laroia et al. | |
| 2010/0138382 A1* | 6/2010 | Nagoya | G06F 21/10 707/609 |
| 2010/0157845 A1 | 6/2010 | Womack et al. | |
| 2010/0165882 A1* | 7/2010 | Palanki | H04W 8/005 370/254 |
| 2010/0291939 A1* | 11/2010 | Jen | H04W 76/028 455/450 |
| 2011/0228666 A1 | 9/2011 | Barbieri et al. | |
| 2011/0243010 A1 | 10/2011 | Geirhofer et al. | |
| 2011/0258313 A1 | 10/2011 | Mallik et al. | |
| 2011/0275382 A1* | 11/2011 | Hakola et al. | 455/452.2 |
| 2011/0305179 A1* | 12/2011 | Wang | H04L 1/0031 370/311 |
| 2012/0044815 A1* | 2/2012 | Geirhofer | H04W 8/005 370/248 |
| 2012/0050004 A1* | 3/2012 | Curtis | G06Q 30/0214 340/5.2 |
| 2012/0106404 A1 | 5/2012 | Damnjanovic | |
| 2012/0163235 A1* | 6/2012 | Ho et al. | 370/254 |
| 2013/0028177 A1* | 1/2013 | Koskela | H04W 4/70 370/328 |
| 2013/0109301 A1* | 5/2013 | Hakola | H04W 76/14 455/39 |
| 2013/0287012 A1 | 10/2013 | Pragada et al. | |
| 2013/0322277 A1 | 12/2013 | Vanganuru et al. | |
| 2013/0322413 A1 | 12/2013 | Pelletier et al. | |
| 2013/0324114 A1 | 12/2013 | Raghothaman et al. | |
| 2014/0092885 A1* | 4/2014 | Venkatachalam | H04W 76/023 370/338 |
| 2014/0213186 A1* | 7/2014 | Gage | H04W 4/023 455/41.2 |
| 2014/0321416 A1 | 10/2014 | Pragada et al. | |
| 2015/0063095 A1 | 3/2015 | Deng et al. | |
| 2015/0139004 A1* | 5/2015 | Fodor | H04W 72/082 370/252 |
| 2015/0156165 A1* | 6/2015 | Lindoff | H04W 8/005 370/329 |

FOREIGN PATENT DOCUMENTS

| | | | | |
|---|---|---|---|---|
| WO | 2012/015698 | | 2/2012 | |
| WO | WO 2013/055271 | * | 4/2013 | ............ H04W 36/08 |
| WO | WO 2013055271 A1 | * | 4/2013 | |
| WO | 2013163634 A1 | | 10/2013 | |
| WO | WO 2014/014323 | * | 1/2014 | ............ H04W 24/00 |
| WO | WO 2014014323 A1 | * | 1/2014 | |

OTHER PUBLICATIONS

De La Oliva et al., "IP Flow Mobility: Smart Traffic Offload for Future Wireless Networks," Traffic Management for Mobile Broadband Networks, IEEE Communications Magazine, pp. 124-132 (Oct. 2011).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 9: Interworking with External Networks, IEEE Std. 802.11u-2011 (Feb. 25, 2011).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
Melia et al., "Logical Interface Support for Multi-Mode IP Hosts," Netext WG, Internet-draft, draft-ietf-netext-logical-interface-support-03.txt (Sep. 5, 2011).
Rescorla et al., "Datagram Transport Layer Security Version 1.2," Internet Engineering Task Force (IETF), Request for Comments: 6347 (Jan. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.19.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.14.1 (Mar. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.9.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11," 3GPP TS 36.211 V11.2.0 (Feb. 2013).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.7.0 (Dec. 2012).

(56) References Cited

OTHER PUBLICATIONS

Third Generation Partnership Project, "Technical Specification Group Radio Access Network; Evolved Universal Terrestrial Radio Access (E-UTRA); Multiplexing and channel coding (Release 11)," 3GPP TS 36.212 V11.2.0 (Feb. 2013).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.9.0 (Feb. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.2.0 (Feb. 2013).
Third Generation Partnership Project, "Technical Specification Group Core Network and Terminals; General Packet Radio Service (GPRS); GPRS Tunnelling Protocol (GTP) across the Gn and Gp interface (Release 6)," 3GPP TS 29.060 V6.21.1 (Apr. 2010).
Third Generation Partnership Project, "Technical Specification Group Core Network and Terminals; General Packet Radio Service (GPRS); GPRS Tunnelling Protocol (GTP) across the Gn and Gp interface (Release 7)," 3GPP TS 29.060 V7.17.0 (Sep. 2011).
Third Generation Partnership Project, "Technical Specification Group Core Network and Terminals; General Packet Radio Service (GPRS); GPRS Tunnelling Protocol (GTP) across the Gn and Gp interface (Release 8)," 3GPP TS 29.060 V8.15.0 (Sep. 2011).
Third Generation Partnership Project, "Technical Specification Group Core Network and Terminals; General Packet Radio Service (GPRS); GPRS Tunnelling Protocol (GTP) across the Gn and Gp interface (Release 8)," 3GPP TS 29.060 V8.16.0 (Jun. 2012).
Third Generation Partnership Project, "Technical Specification Group Core Network and Terminals; General Packet Radio Service (GPRS); GPRS Tunnelling Protocol (GTP) across the Gn and Gp interface (Release 9)," 3GPP TS 29.060 V9.10.0 (Mar. 2012).
Third Generation Partnership Project, "Technical Specification Group Core Network and Terminals; General Packet Radio Service (GPRS); GPRS Tunnelling Protocol (GTP) across the Gn and Gp interface (Release 9)," 3GPP TS 29.060 V9.12.0 (Mar. 2013).
Third Generation Partnership Project, "Technical Specification Group Core Network and Terminals; General Packet Radio Service (GPRS); GPRS Tunnelling Protocol (GTP) across the Gn and Gp interface (Release 10)," 3GPP TS 29.060 V10.5.0 (Mar. 2012).
Third Generation Partnership Project, "Technical Specification Group Core Network and Terminals; General Packet Radio Service (GPRS); GPRS Tunnelling Protocol (GTP) across the Gn and Gp interface (Release 10)," 3GPP TS 29.060 V10.8.0 (Mar. 2013).
Third Generation Partnership Project, "Technical Specification Group Core Network and Terminals; General Packet Radio Service (GPRS); GPRS Tunnelling Protocol (GTP) across the Gn and Gp interface (Release 11)," 3GPP TS 29.060 V11.2.0 (Mar. 2012).
Third Generation Partnership Project, "Technical Specification Group Core Network and Terminals; General Packet Radio Service (GPRS); GPRS Tunnelling Protocol (GTP) across the Gn and Gp interface (Release 11)," 3GPP TS 29.060 V11.6.0 (Mar. 2013).
Third Generation Partnership Project, "Technical Specification Group Core Network and Terminals; General Packet Radio Service (GPRS); GPRS Tunnelling Protocol (GTP) across the Gn and Gp interface (Release 12)," 3GPP TS 29.060 V12.0.0 (Mar. 2013).
Third Generation Partnership Project, "Technical Specification Group Radio Access Network; Evolved Universal Terrestrial Radio Access (E-UTRA); Relay architectures for E-UTRA (LTE-Advanced) (Release 9)," 3GPP TR 36.806 36.806 V9.0.0 (Mar. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.8.0 (Mar. 2013).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.2.0 (Mar. 2013).
Third Generation Partnership Project, "Technical Specification Group Services and System Aspects; System Improvements for Machine-Type Communications (Release 11)," 3GPP TR 23.888 V1.6.1 (Feb. 2012).
Third Generation Partnership Project, "Technical Specification Group Services and System Aspects; System improvements for Machine-Type Communications (MTC) (Release 11)," 3GPP TR 23.888 V11.0.0 (Sep. 2012).
Third Generation Partnership Project, "Technical Specification Group Services and System Aspects; Architecture enhancements to facilitate communications with packet data networks and applications (Release 11)," 3GPP TS 23.682 V11.0.0 (Mar. 2012).
Third Generation Partnership Project, "Technical Specification Group Services and System Aspects; Architecture enhancements to facilitate communications with packet data networks and applications (Release 11)," 3GPP TS 23.682 V11.3.0 (Dec. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.18.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.12.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.15.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.7.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.10.0 (Mar. 2013).
Third Generation Partnership Project, "Technical Specification Group Services and System Aspects; General Packet Radio Service

(56) References Cited

OTHER PUBLICATIONS (GPRS) enhancements for Evolved Universal Terrestrial Radio Access Network (E-UTRAN) access (Release 11)," 3GPP TS 23.401 V11.1.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.5.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.0.0 (Mar. 2013).
Third Generation Partnership Project, "Technical Specification Group Services and System Aspects; Architecture enhancements for non-3GPP accesses (Release 8)," 3GPP TS 23.402 V8.10.0 (Mar. 2012).
Third Generation Partnership Project, "Technical Specification Group Services and System Aspects; Architecture enhancements for non-3GPP accesses (Release 9)," 3GPP TS 23.402 V9.12.0 (Mar. 2012).
Third Generation Partnership Project, "Technical Specification Group Services and System Aspects; Architecture enhancements for non-3GPP accesses (Release 10)," 3GPP TS 23.402 V10.7.0 (Mar. 2012).
Third Generation Partnership Project, "Technical Specification Group Services and System Aspects; Architecture enhancements for non-3GPP accesses (Release 10)," 3GPP TS 23.402 V10.8.0 (Sep. 2012).
Third Generation Partnership Project, "Technical Specification Group Services and System Aspects; Architecture enhancements for non-3GPP accesses (Release 11)," 3GPP TS 23.402 V11.2.0 (Mar. 2012).
Third Generation Partnership Project, "Technical Specification Group Services and System Aspects; Architecture enhancements for non-3GPP accesses (Release 11)," 3GPP TS 23.402 V11.6.0 (Mar. 2013).
Third Generation Partnership Project, "Technical Specification Group Services and System Aspects; Architecture enhancements for non-3GPP accesses (Release 12)," 3GPP TS 23.402 V12.0.0 (Mar. 2013).
Third Generation Partnership Project, "Technical Specification Group Services and System Aspects; Functional stage 2 description of Location Services (LCS) (Release 9)," 3GPP TS 23.271 V9.8.0 (Mar. 2013).
Third Generation Partnership Project, "Technical Specification Group Services and System Aspects; Functional stage 2 description of Location Services (LCS) (Release 8)," 3GPP TS 23.271 V8.1.0 (Dec. 2009).
Third Generation Partnership Project, "Technical Specification Group Services and System Aspects; Functional stage 2 description of Location Services (LCS) (Release 9)," 3GPP TS 23.271 V9.6.0 (Mar. 2011).
Third Generation Partnership Project, "Technical Specification Group Services and System Aspects; Functional stage 2 description of Location Services (LCS) (Release 10)," 3GPP TS 23.271 V10.4.0 (Mar. 2013).
Third Generation Partnership Project, "Technical Specification Group Services and System Aspects; Functional stage 2 description of Location Services (LCS) (Release 11)," 3GPP TS 23.271 V11.2.0 (Mar. 2013).
Third Generation Partnership Project, "Technical Specification Group Services and System Aspects; Functional stage 2 description of Location Services (LCS) (Release 10)," 3GPP TS 23.271 V10.2.0 (Mar. 2011).
Third Generation Partnership Project, "Technical Specification Group Services and System Aspects; Network architecture (Release 12)," 3GPP TS 23.002 V12.1.0 (Dec. 2012).

Third Generation Partnership Project, "Technical Specification Group Services and System Aspects; Network architecture (Release 9)," 3GPP TS 23.002 V9.6.0 (Sep. 2011).
Third Generation Partnership Project, "Technical Specification Group Services and System Aspects; Network architecture (Release 10)," 3GPP TS 23.002 V10.5.0 (Dec. 2012).
Third Generation Partnership Project, "Technical Specification Group Services and System Aspects; Network architecture (Release 11)," 3GPP TS 23.002 V11.2.0 (Mar. 2012).
Third Generation Partnership Project, "Technical Specification Group Services and System Aspects; Network architecture (Release 10)," 3GPP TS 23.002 V10.4.0 (Dec. 2011).
Third Generation Partnership Project, "Technical Specification Group Services and System Aspects; Network architecture (Release 8)," 3GPP TS 23.002 V8.7.0 (Dec. 2010).
Third Generation Partnership Project, "Technical Specification Group Services and System Aspects; Network architecture (Release 11)," 3GPP TS 23.002 V11.5.0 (Dec. 2012).
Third Generation Partnership Project, "Technical Specification Group Core Network and Terminals; Non-Access-Stratum (NAS) protocol for Evolved Packet System (EPS); Stage 3(Release 8)," 3GPP TS 24.301 V8.10.0 (Jun. 2011).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.6.1 (Mar. 2012).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.9.0 (Mar. 2012).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.2.1 (Mar. 2012).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.11.0 (Mar. 2013).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.6.0 (Mar. 2013).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.10.0 (Mar. 2013).
Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.0.0 (Mar. 2013).
Third Generation Partnership Project, "Technical Specification Group SA; Feasibility Study for Proximity Services (ProSe) (Release 12)," 3GPP TR 22.803 V0.2.0 (Feb. 2012).
Third Generation Partnership Project, "Technical Specification Group Services and System Aspects; Feasibility study for Proximity Services (ProSe) (Release 12)," 3GPP TR 22.803 V12.1.0 (Mar. 2013).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.10.0 (Sep. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.7.0 (Sep. 2011).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.7.0 (Mar. 2012).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.2.0 (Mar. 2012).

(56) References Cited

OTHER PUBLICATIONS

Third Generation Partnership Project, "Technical Specification Group Core Network and Terminals; Access to the 3GPP Evolved Packet Core (EPC) via non-3GPP access networks; Stage 3 (Release 12)," 3GPP TS 24.302 V12.0.0 (Mar. 2013).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.6.0 (Mar. 2013).
Third Generation Partnership Project, "Technical Specification Group Core Network and Terminals; Access Network Discovery and Selection Function (ANDSF) Management Object (MO) (Release 8)," 3GPP TS 24.312 V8.5.0 (Mar. 2010).
Third Generation Partnership Project, "Technical Specification Group Core Network and Terminals; Access Network Discovery and Selection Function (ANDSF) Management Object (MO) (Release 10)," 3GPP TS 24.312 V10.5.0 (Mar. 2012).
Third Generation Partnership Project, "Technical Specification Group Core Network and Terminals; Access Network Discovery and Selection Function (ANDSF) Management Object (MO) (Release 9)," 3GPP TS 24.312 V9.2.0 (Sep. 2011).
Third Generation Partnership Project, "Technical Specification Group Core Network and Terminals; Access Network Discovery and Selection Function (ANDSF) Management Object (MO) (Release 11)," 3GPP TS 24.312 V11.2.0 (Mar. 2012).
Third Generation Partnership Project, "Technical Specification Group Core Network and Terminals; Access Network Discovery and Selection Function (ANDSF) Management Object (MO) (Release 10)," 3GPP TS 24.312 V10.6.0 (Jun. 2012).
Third Generation Partnership Project, "Technical Specification Group Core Network and Terminals; Access Network Discovery and Selection Function (ANDSF) Management Object (MO) (Release 12)," 3GPP TS 24.312 V12.0.0 (Mar. 2013).
Third Generation Partnership Project, "Technical Specification Group Core Network and Terminals; Access Network Discovery and Selection Function (ANDSF) Management Object (MO) (Release 11)," 3GPP TS 24.312 V11.6.0 (Mar. 2013).
Third Generation Partnership Project, "Technical Specification Group Core Network and Terminals; Access Network Discovery and Selection Function (ANDSF) Management Object (MO) (Release 8)," 3GPP TS 24.312 V8.6.0 (Jun. 2012).
Third Generation Partnership Project, "Technical Specification Group Core Network and Terminals; Access Network Discovery and Selection Function (ANDSF) Management Object (MO) (Release 9)," 3GPP TS 24.312 V9.3.0 (Jun. 2012).
Third Generation Partnership Project, "Technical Specification Group Services and System Aspects; Generic Authentication Architecture (GAA); Generic bootstrapping architecture (GBA) (Release 8)," 3GPP TS 33.220 V8.9.0 (Mar. 2012).
Third Generation Partnership Project, "Technical Specification Group Services and System Aspects; Generic Authentication Architecture (GAA); Generic Bootstrapping Architecture (GBA) (Release 10)," 3GPP TS 33.220 V10.1.0 (Mar. 2012).
Third Generation Partnership Project, "Technical Specification Group Services and System Aspects; Generic Authentication Architecture (GAA); Generic Bootstrapping Architecture (GBA) (Release 11)," 3GPP TS 33.220 V11.2.0 (Mar. 2012).
Third Generation Partnership Project, "Technical Specification Group Services and System Aspects; Generic Authentication Architecture (GAA); Generic Bootstrapping Architecture (GBA) (Release 12)," 3GPP TS 33.220 V12.0.0 (Mar. 2013).
Third Generation Partnership Project, "Technical Specification Group Services and System Aspects; Generic Authentication Architecture (GAA); Generic Bootstrapping Architecture (GBA) (Release 11)," 3GPP TS 33.220 V11.4.0 (Sep. 2012).
Third Generation Partnership Project, "Technical Specification Group Services and System Aspects; Generic Authentication Architecture (GAA); Generic Bootstrapping Architecture (GBA) (Release 9)," 3GPP TS 33.220 V9.4.0 (Mar. 2012).
Third Generation Partnership Project, "Technical Specification Group Core Network and Terminals; General Packet Radio System (GPRS) Tunnelling Protocol User Plane (GTPv1-U) (Release 8)," 3GPP TS 29.281 V8.5.0 (Mar. 2010).
Third Generation Partnership Project, "Technical Specification Group Core Network and Terminals; General Packet Radio System (GPRS) Tunnelling Protocol User Plane (GTPv1-U) (Release 9)," 3GPP TS 29.281 V9.3.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.9.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.10.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.5.0 (Mar. 2013).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).
Third Generation Partnership Project, "Technical Specification Group Radio Access Network; Evolved Universal Terrestrial Radio Access Network (E-UTRAN); X2 application protocol (X2AP) (Release 8)," 3GPP TS 36.423 V8.9.0 (Mar. 2010).
Third Generation Partnership Project, "Technical Specification Group Radio Access Network; Evolved Universal Terrestrial Radio Access Network (E-UTRAN); X2 application protocol (X2AP) (Release 9)," 3GPP TS 36.423 V9.6.0 (Mar. 2011).
Third Generation Partnership Project, "Technical Specification Group Radio Access Network; Evolved Universal Terrestrial Radio Access Network (E-UTRAN); X2 application protocol (X2AP) (Release 10)," 3GPP TS 36.423 V10.5.0 (Mar. 2012).
Third Generation Partnership Project, "Technical Specification Group Radio Access Network; Evolved Universal Terrestrial Radio Access Network (E-UTRAN); X2 application protocol (X2AP) (Release 11)," 3GPP TS 36.423 V11.0.0 (Mar. 2012).
Third Generation Partnership Project, "Technical Specification Group Radio Access Network; Evolved Universal Terrestrial Radio Access Network (E-UTRAN); X2 application protocol (X2AP) (Release 11)," 3GPP TS 36.423 V11.4.0 (Mar. 2013).
Third Generation Partnership Project, "Technical Specification Group Core Network and Terminals; General Packet Radio System (GPRS) Tunnelling Protocol User Plane (GTPv1-U) (Release 10)," 3GPP TS 29.281 V10.3.0 (Sep. 2011).
Third Generation Partnership Project, "Technical Specification Group Core Network and Terminals; General Packet Radio System (GPRS) Tunnelling Protocol User Plane (GTPv1-U) (Release 11)," 3GPP TS 29.281 V11.2.0 (Mar. 2012).

(56) References Cited

OTHER PUBLICATIONS

Third Generation Partnership Project, "Technical Specification Group Core Network and Terminals; General Packet Radio System (GPRS) Tunnelling Protocol User Plane (GTPv1-U) (Release 11)," 3GPP TS 29.281 V11.6.0 (Mar. 2013).

Zeira, "Application reference for PAC," IEEE P802.15 Wireless Personal Area Networks, IEEE P802.15 Working Group for Wireless Personal Area Networks (WPANs), IEEE P802.15-12-0230-01-0008 (May 2012).

Kreher et al., "LTE Signaling, Troubleshooting and Optimization", First edition (2011).

Olsson et al., "SAE and the Evolved Packet Core—Driving the Mobile Broadband Revolution," First edition (2009).

Sesia et al., "LTE—The UMTS Long Term Evolution: From Theory to Practice," John Wiley & Sons, Ltd., 1st edition (2009).

Sesia et al., "LTE—The UMTS Long Term Evolution: From Theory to Practice," John Wiley & Sons, Ltd., 2nd edition (2011).

Pragada et al., "System Architecture for LTE-based Coverage Solution using UE Relays," IEEE Future Network & Mobile Summit, Berlin, Germany (Jul. 4-6, 2012).

Raghothaman et al., "Architecture and Protocols for LTE-based Device to Device Communication," 2013 International Conference on Computing, Networking, and Communications, pp. 895-899 (2013).

Raghothaman et al., "System Architecture for a Cellular Network with Cooperative Mobile Relay," 2011 IEEE Vehicular Techonology Conference, pp. 1-5 (2011).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Third Generation Partnership Project, "Technical Specification Group SA; Feasibility Study for Proximity Services (ProSe) (Release 12)," 3GPP TR 22.803 V0.3.0 (May 2012).

* cited by examiner

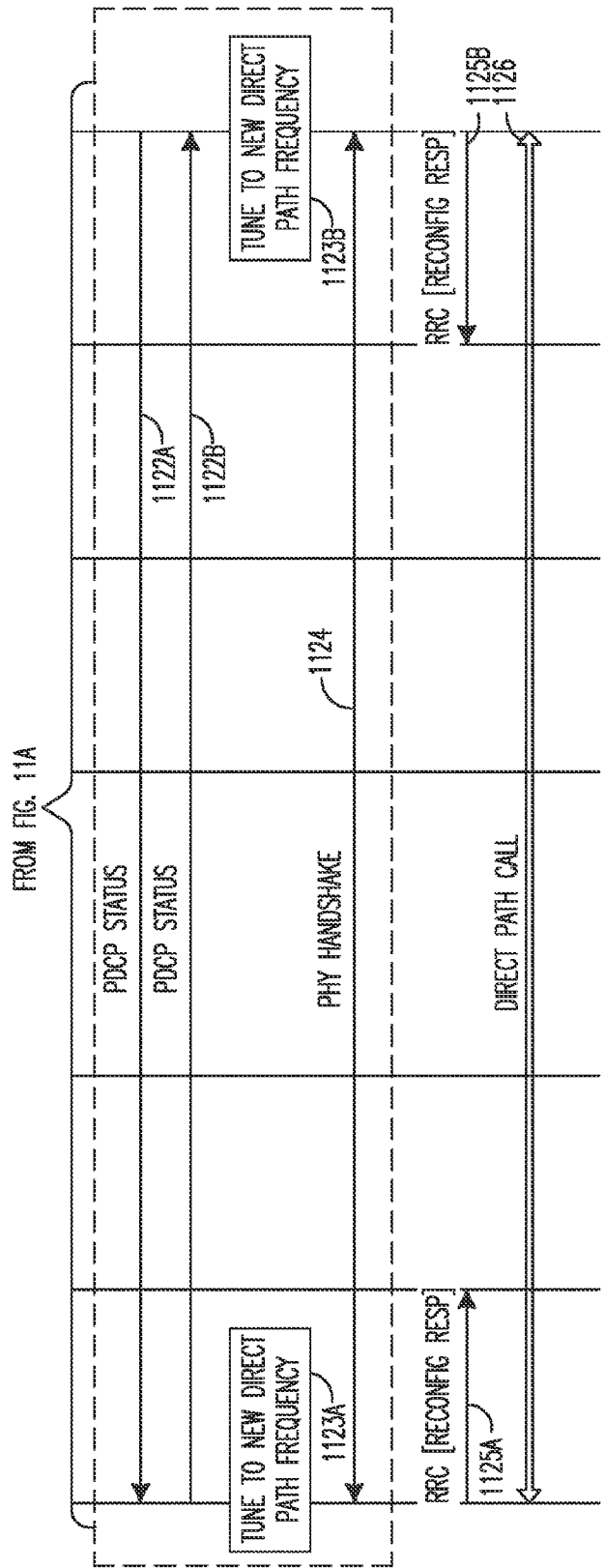
FIG. 11A1

METHOD AND APPARATUS FOR DEVICE-TO-DEVICE (D2D) MOBILITY IN WIRELESS SYSTEMS

CROSS REFERENCE TO RELATED APPLICATIONS

This application claims the benefit of U.S. Provisional Application Ser. No. 61/653,643 filed May 31, 2012 and U.S. Provisional Application Ser. No. 61/818,182 filed May 1, 2013, the contents of which are hereby incorporated by reference herein.

BACKGROUND

The demand for wireless mobile data continues to explode, and this is leading to a surge in the number of smart phones in usage throughout the world. The telecommunications industry has responded to demand with newer standards that may provide increases in spectral efficiency through the use of better multiple access, modulation and coding and multi-antenna techniques. Another dimension for capacity improvement has been through the increase in the density of deployment and correspondingly reducing the cell radius. In addition, heterogeneous topologies have been increasingly used, wherein small cells (micro/pico/femto) are deployed in conjunction with macro cells. Indoor coverage improvements through the use of remote radio-heads and distributed antennas may have also proliferated. However, small cell deployments may lead to a huge increase in mobility events, and the accompanying interference management issues may be complex. Large amounts of additional infrastructure may be needed, such as high capacity internet backhaul, power sources, and radio frequency (RF) equipment, which may need to be maintained.

SUMMARY

A method and apparatus for mobility for device-to-device (D2D) communications is disclosed. A WTRU may store a proximity detection configuration that includes a measurement object corresponding to at least one discovery signal property. The WTRU may perform a proximity detection measurement to detect a discovery signal property and then establish D2D communication based on detecting the discovery signal property. A radio resource control (RRC) Measurement Report may be received from a WTRU. Methods for D2D mobility procedures are also disclosed including mobility to or from a direct path, to or from a local path, to or from an infrastructure path, changing serving cell, and cell reselection. Other embodiments include: behavior upon mobility failure, radio link failure, and direct link failure. Security configuration and activation methods and apparatuses are also disclosed. Network methods for inter-eNB management are also disclosed. Finally, direct path proximity detection measurements and methods and apparatuses for triggering and establishing D2D sessions are disclosed.

BRIEF DESCRIPTION OF THE DRAWINGS

A more detailed understanding may be had from the following description, given by way of example in conjunction with the accompanying drawings wherein:

FIG. 11A1 is a continuation of the example of infrastructure handover during direct path call;

DETAILED DESCRIPTION

Figure 1A:
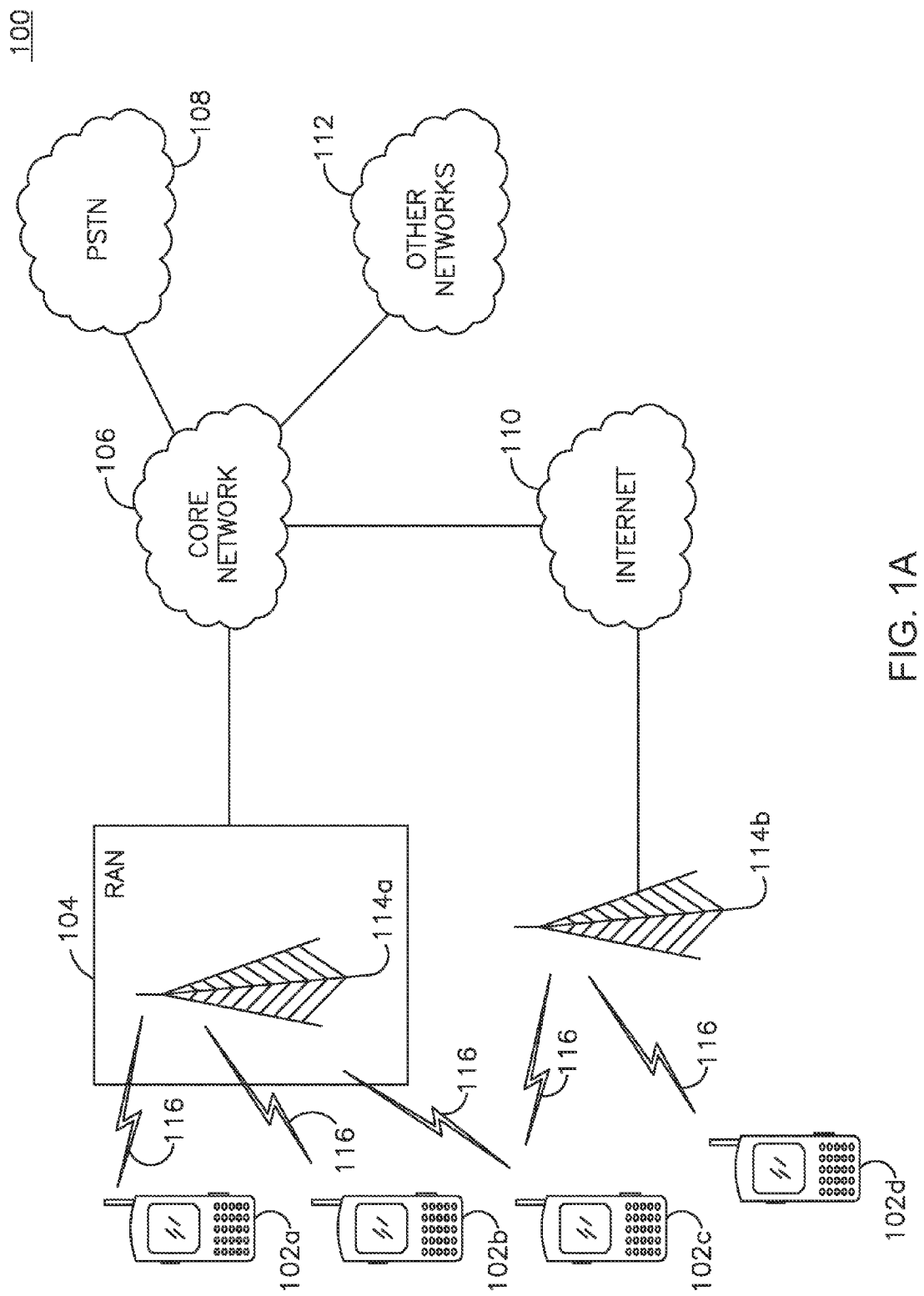
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
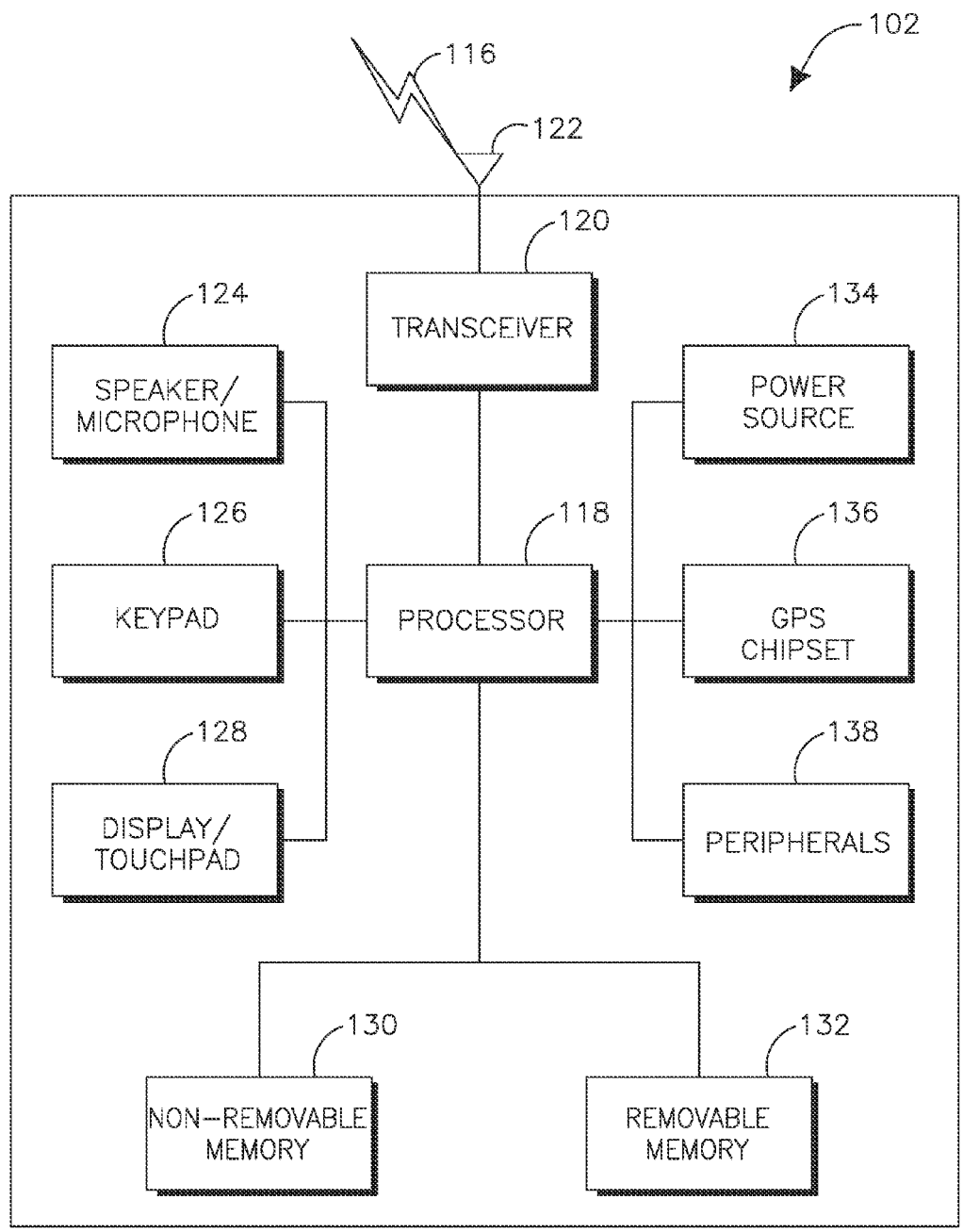
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
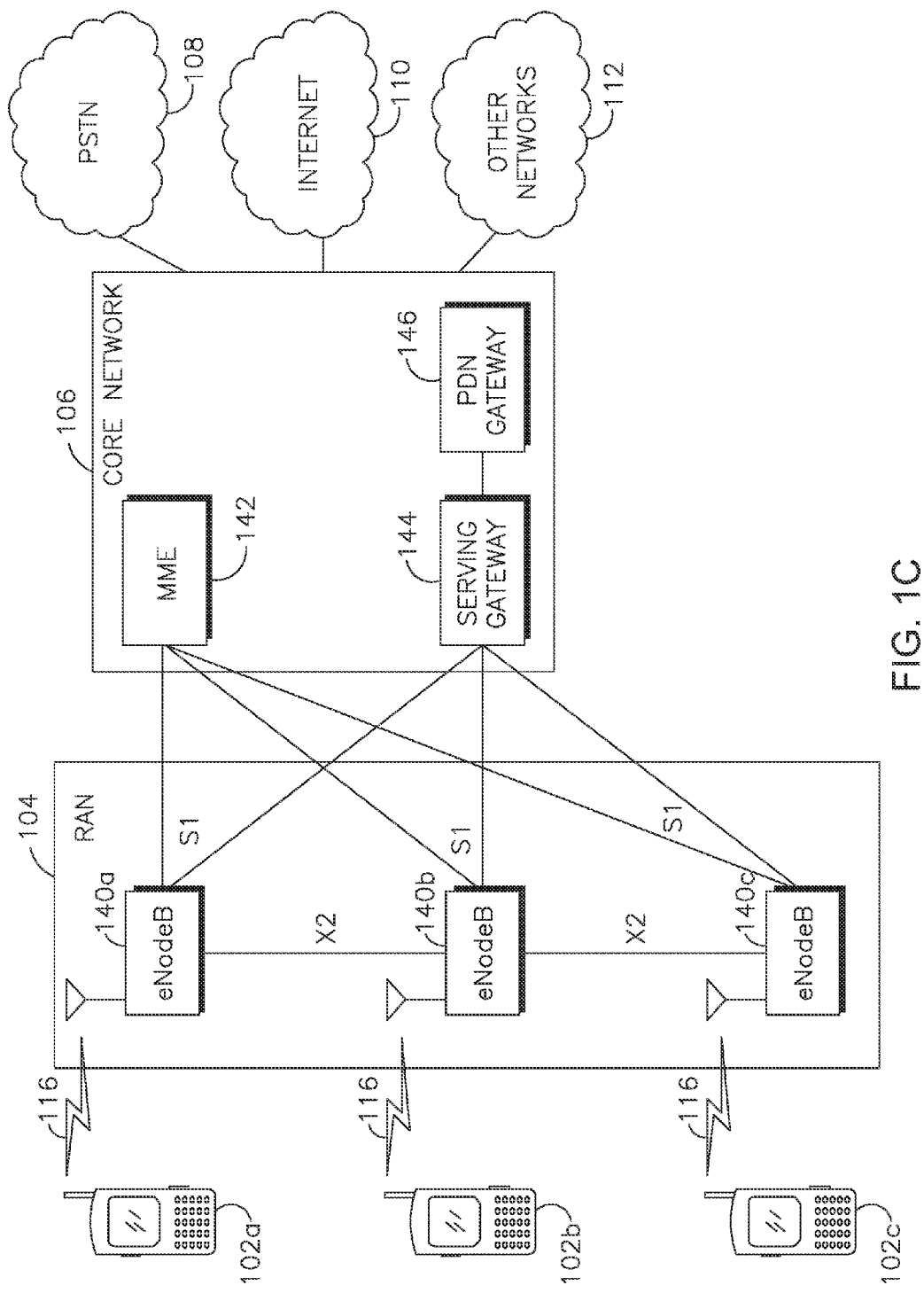
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Smart phones, which have become increasingly powerful devices may be designed with multiple wideband radios and modems and the capability to process large amounts of data, as well as run multiple simultaneous applications. Allowing smart phones to communicate directly with each other when possible may enable the creation of alternate network topologies that allow smart phones to communicate directly while also co-existing with the conventional cellular deployment. A device-to-device (D2D) architecture is an example of such an alternate topology.

Figure 2:
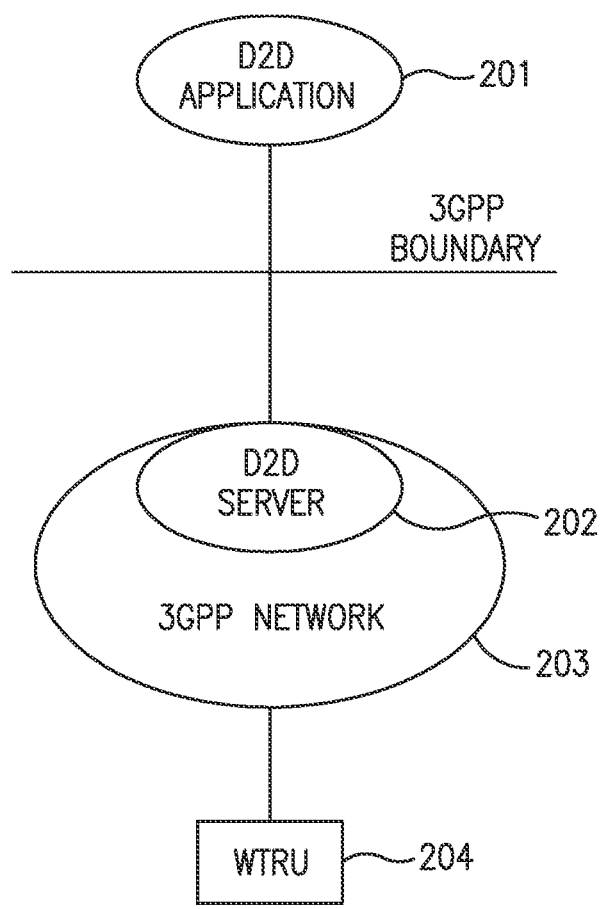
FIG. 2 is an example of device-to-device (D2D) architecture with a condensed view of a direct model.

FIG. 2 is an example of a device-to-device (D2D) architecture 200. FIG. 2 shows the D2D server 202 may be located within the 3GPP network 203 boundary. The D2D server 202 may be maintained as a single entity that is common to multiple operators and may be managed jointly by them, or it may be distributed as multiple entities, located partly in each operators' domain. The D2D server 202 may provide the WTRU 204 access to a D2D application 201.

Enabled by such direct WTRU-to-WTRU communications, Advanced Topology (AT) applications may include Advanced Topology-Relay (AT-R) and Advanced Topology-Local Offload (AT-LO). In the AT-R application, a Terminal WTRU (T-WTRU) may be able to exchange data with the network through a relay node, which may be a Helper WTRU (H-WTRU). The AT-LO application may allow the direct data communication between WTRUs in proximity of each other and under the control of the central network.

The AT-R application may include two modes, capacity mode and coverage mode. In the capacity mode, the T-WTRU may be associated with the network and may enlist the H-WTRU to augment the radio link capacity and improve data transmission capacity. While in the coverage mode, the T-WTRU may be out of network coverage and may rely on a H-WTRU to attain the network association. Both modes may be envisioned for low mobility WTRUs.

In the AT-LO application, WTRUs in proximity may either be a source or a sink for the information exchanged. The radio link between the WTRUs in AT-LO application may use licensed cellular spectrum or unlicensed or lightly-licensed spectrum.

The communication between WTRUs may occur in a dedicated channel called the cross link (XL), as opposed to the eNB to WTRU communications that may happen over the radio link. The XL may be in a separate band (out-band solution) or in the same band as the radio link, even in adjacent frequency subcarriers. The H-WTRU and T-WTRU may communicate with each other either in Frequency Division Duplexing (FDD) or Time Division Duplexing (TDD) fashion. The related configuration may be defined by the network. The network may provide coarse resource allocation for the XL, and the WTRUs may have the freedom to handle the per-TTI resource allocation.

Figure 3:
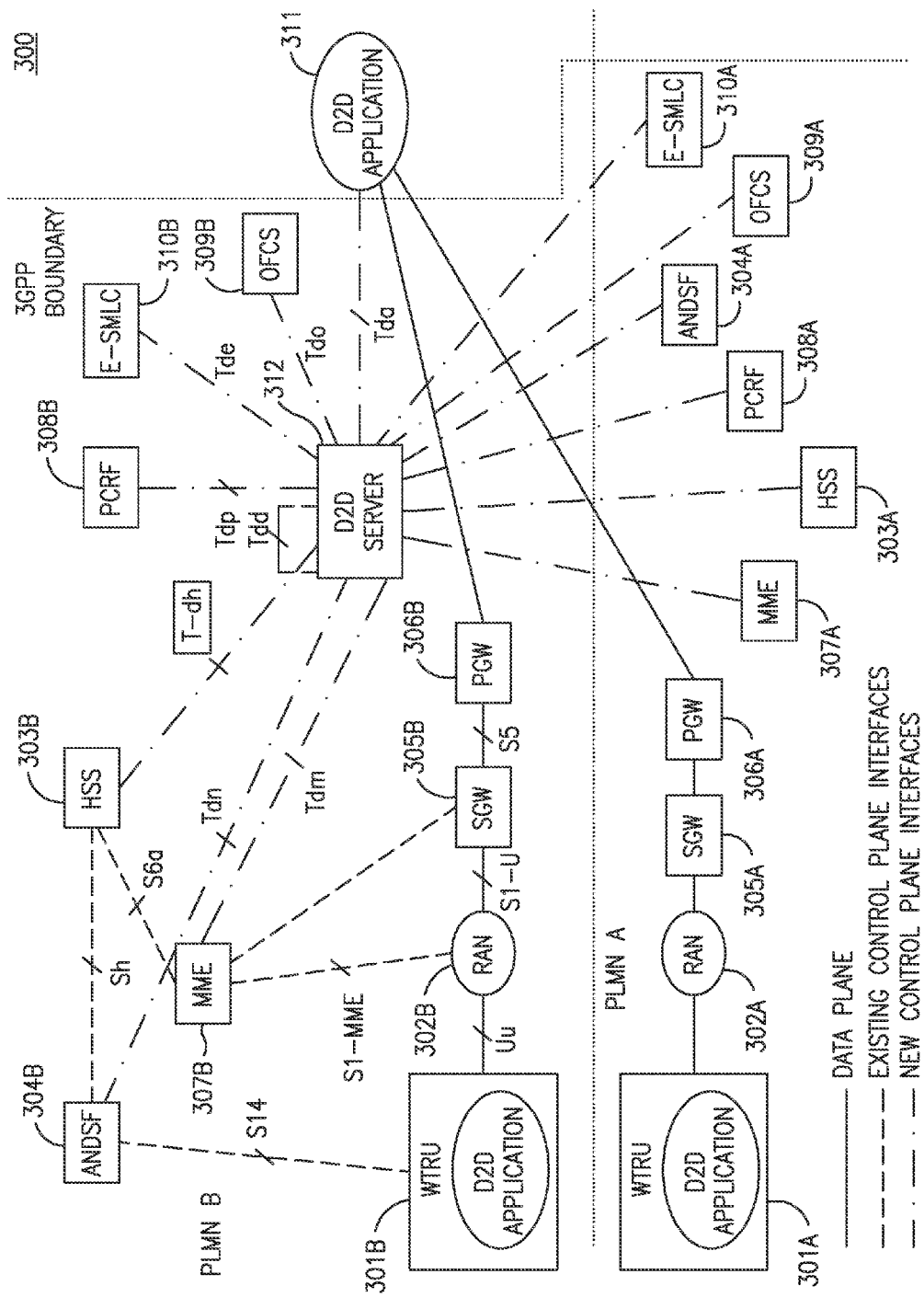
FIG. 3 is an example of D2D architecture with an expanded view of the direct model.

FIG. 3 is an expanded view of an example D2D architecture. WTRU 301A may connect to a D2D Application 311 via a RAN 302A, SGW 305A and PGW 306A on the data plane. Similarly WTRU 301B may connect to a D2D Application 311 via a RAN 302B, SGW 305B and PGW 306B on the data plane. The D2D Server 312 may connect via control plan interfaces to ANDSF 304A and 304B, MME 307A and 307B, HSS 303A and 303B, PCRF 308A and 308B, OCFS 309A and 309B, and E-SMLC 310A and 310B.

Figure 4:
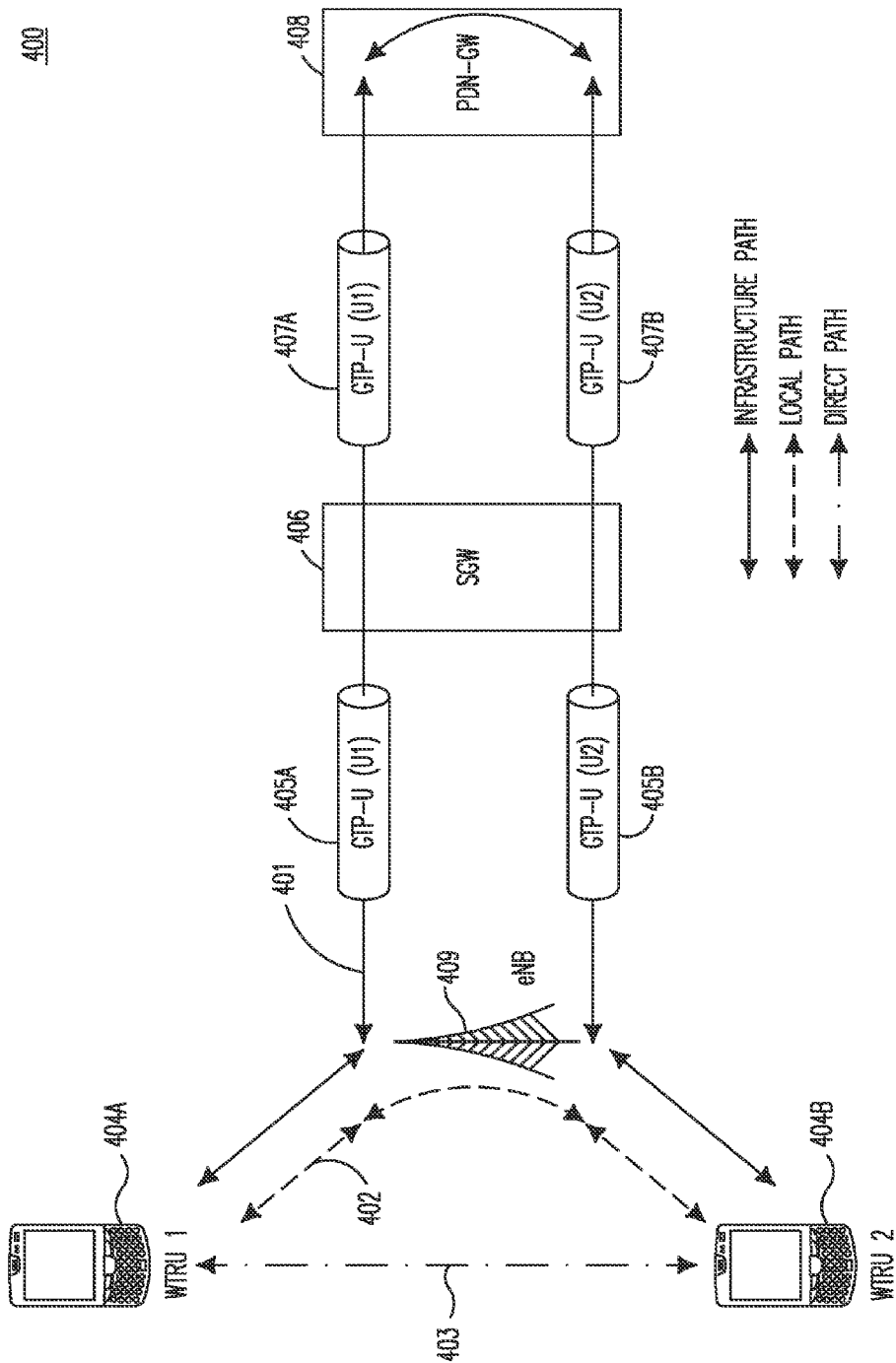
FIG. 4 is an example of data path options for the intra-eNB case.

FIG. 4 provides a high level architecture 400 for both the local and direct path options for D2D communication for an intra-eNB case. FIG. 4 shows the contrast between the cellular infrastructure path 401 and the local path 402 and direct path 403. WTRU1 404A and WTRU2 404B may communicate via their transmitters and receivers in a D2D session via eNB 409 over the direct path 403 or over the local path 402. When WTRU1 404A and WTRU2 404B communicate over the infrastructure path 401 via eNB 409, their communication may be routed through GTP-U tunnels 405A and 405B, the SGW 406, GTP-U tunnels 407A and 407B and the PDN-GW 408.

D2D communications have become a subject of discussion in 3GPP with the introduction of the Proximity Services (ProSe) study item in the SA1 group. The scope of ProSe may include both the direct path and the local path. In the direct path the physical communication may be directly between the D2D devices. In the local Path the communication may be through the eNB to which both the devices are connected.

Several use cases have also been defined as part of ProSe, each of which may bring up a different set of requirements for system design. These may be broadly categorized under social and public safety.

Examples of social use cases are given in the following. For a basic social use case, D2D users may be able to discover and be discoverable by other D2D users that belong to their user group (e.g. friends' list), and then may be able to use a social network application over the D2D link. The discovery may be performed without any WTRU location information. For Public discovery, a D2D user may be discoverable by any other D2D user without needing prior permission. For different Public Land Mobile Network (PLMN) discovery, D2D users belonging to different PLMNs may be discoverable to each other. A sub-set of this may be when the D2D users are also roaming. In a service continuity use case, D2D users may be able to move between direct path and infrastructure mode with no degradation perceivable by the user. For the location and presence use case, operators may be able to enhance their location and presence information with ProSe procedures.

Examples of the public safety (PS) use case include the following. For the basic PS use case, two authorized PS users may be able to communicate directly over a D2D link. A PS D2D user may be able to maintain multiple simultaneous 1-to-1 D2D sessions with different D2D PS users.

To achieve an integrated system architecture that may include D2D communication into a framework of cellular communication, mobility procedures may enable graceful transitions between cellular and D2D communications. The objective of mobility procedures may be to enable WTRUs to move from infrastructure links to direct links in an efficient manner, with reasonable delays, and with no loss of data in the process. Appropriate measurements of the D2D links and reporting of the same to the network may be used for this purpose. The triggering of mobility decisions by the network and/or WTRUs based on these reports in conjunction with other considerations may also be used.

The procedures may include all possible architecture options for D2D, including local path, direct path LTE, and direct path using other radio access technologies (RATs). The procedures may also take into consideration the various protocol architectures that could be used for D2D communication, and provide for the transition between these and the baseline 3GPP protocol architecture.

Architectural enhancements may be used in order to incorporate D2D communication into the 3GPP Evolved Packet Core (EPC). These changes and additions to the existing architecture may be used to achieve the following: to enable the efficient operation of a large number of D2D-capable devices in the network; to enable the coexistence of D2D links along with the traditional cellular links; to fulfill all the deployment configurations envisioned for the 3GPP ProSe feature; and to fulfill all the service requirements for D2D communication as laid out by 3GPP.

D2D mobility procedures for a multitude of scenarios including intra and inter-eNB, intra and inter-PLMN are disclosed. The D2D mobility procedure used may be based on the system architecture and the specific mobility scenario.

Mobility in the D2D context may consist of several distinct types. A first type refers to a change in communication path (the offload scenario):

This type may be modeled as a reconfiguration for a WTRU in RRC CONNECTED mode that may be configured with a D2D session and/or service. The reconfiguration may initiate or modify the communication path, such that data between one or more WTRUs may switch to a direct communication path, to a local communication path, or to the infrastructure path.

A second type refers to a change of serving cell (the handover scenario): This type may involve a mobility event such as a handover from one serving cell to another serving cell. This handover may be inter-eNB for a WTRU in RRC CONNECTED mode that is configured with a D2D session and/or service.

A third type refers to cell reselection (IDLE mode mobility): A WTRU in RRC IDLE mode may be configured with a D2D session and/or service. For example, a WTRU may be receiving data transmissions on a D2D link, which was previously configured either by dedicated signaling before the WTRU moved to IDLE mode or by reception of broadcasted signaling. In this scenario, the WTRU may reselect a different cell while in RRC IDLE.

A key difference between the first two types is that in the offload scenario, the same infrastructure link, which may be for example the Uu interface, may continue to be used after the event. In contrast, the handover scenario may involve using a different infrastructure node after the event. Another differentiating aspect is that in the handover scenario, a failure during the handover process may lead to a radio link failure, which in turn may lead to a re-establishment procedure. In the offload scenario, however, a failure in the reconfiguration of the communication path may lead to sub-optimal performance but not necessarily to a state of radio-link failure from the RRC connectivity perspective.

For some services, a change in the communication path such as from a D2D link to the infrastructure path to a local communication path may not be desirable because the D2D services that are triggered primarily may rely on or be provided due to radio proximity between WTRUs.

Approaches for RRC Connectivity (L3 aspects) and for maintaining service connectivity (L2 aspects) including but not limited to the handling of concerned radio bearers, and/or IP flows for applicable services are described in the following.

The examples herein may be directed to two WTRUs, but may equally be generalized for a plurality of WTRUs that are active for a given service including a D2D communication. A first WTRU and second WTRU connected in a baseline call or direct path call in the examples described may be referred to herein as WTRU1 and WTRU2, respectively. Similarly, first eNB, second eNB, and third eNB in the examples described may be referred to herein as eNB1, eNB2, and eNB3 respectively. The examples herein are not intended to limit the number of WTRUs, eNBs, or other network elements used in the methods and apparatuses disclosed.

Figure 5A:
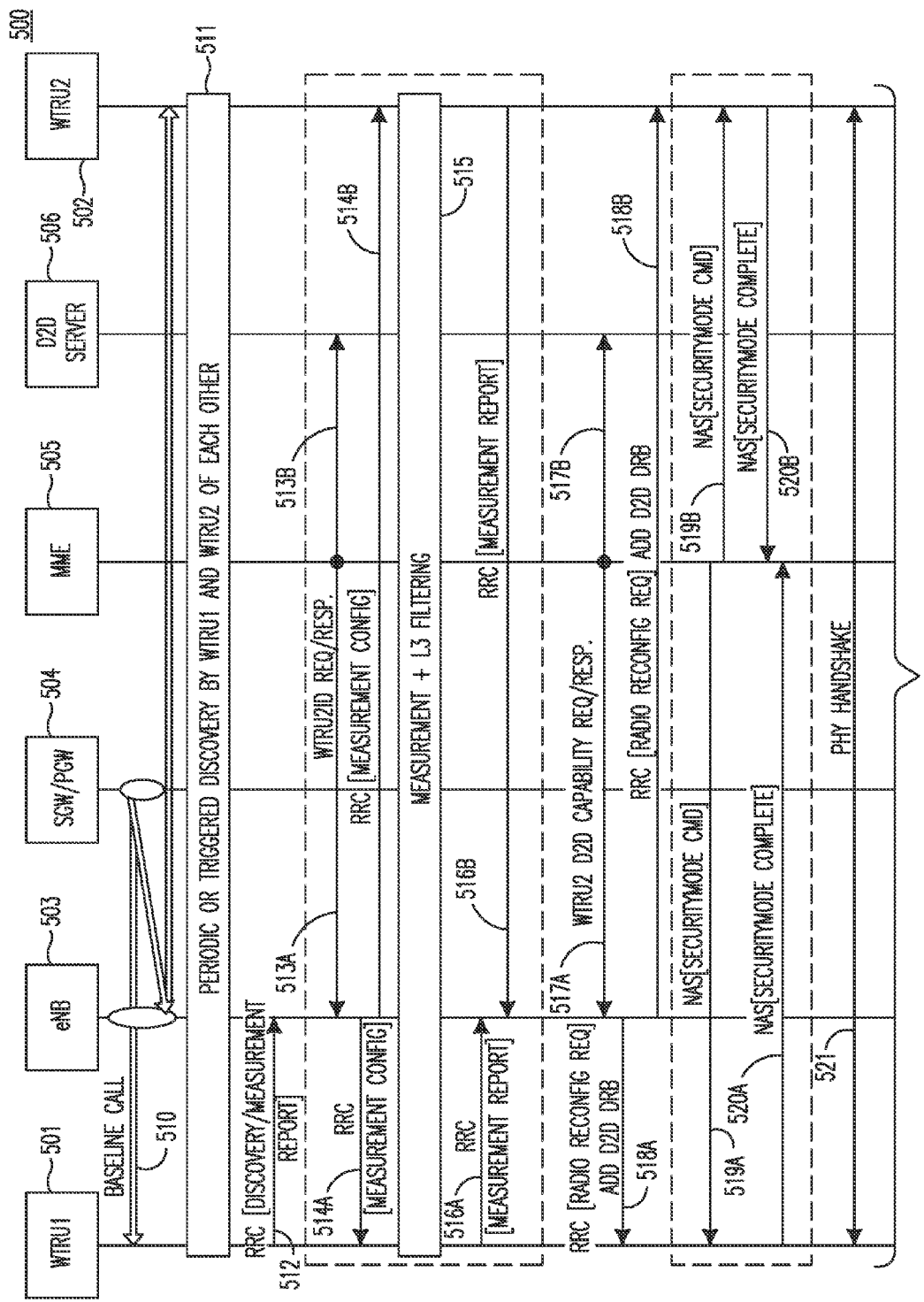
FIG. 5A is an example of infrastructure to Long Term Evolution (LTE) direct for the intra-eNB case.
Figure 5B:
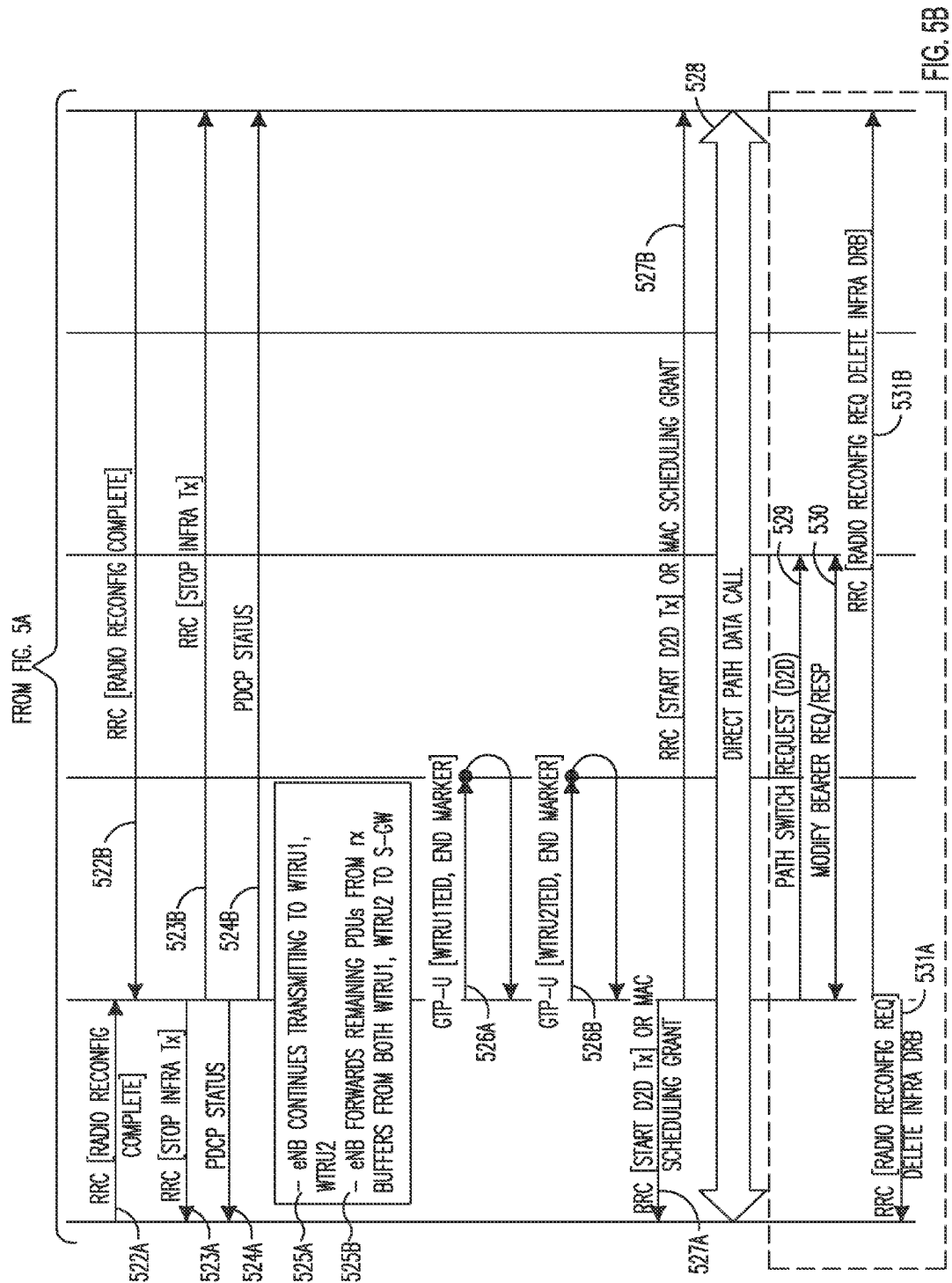
FIG. 5B is a continuation of the example of infrastructure to Long Term Evolution (LTE) direct for the intra-eNB case.

FIGS. 5A-5B is a high-level call flow diagram 500 for a method 500 for offloading traffic for the infrastructure to LTE Direct Path offload scenario (Activation of Uu+CN Offload). FIGS. 5A-5B show the intra-eNB case, but this scenario may also apply when there are multiple eNBs. Moreover, the multiple eNBs may be under the same MME within the same PLMN. Additionally, data paths from two eNBs may lead to the same PGW.

WTRU1 501 and a WTRU2 502 may be connected to eNB 503 and engaged in a baseline call 510 with each other. WTRU1 501 may begin offload of the baseline call 510 with WTRU2 502 to the LTE direct path with a periodic or triggered discovery process 511. In the periodic discovery process 511, a WTRU1 501 or WTRU2 502 may look for discovery sequence transmissions by other WTRUs during pre-determined time instances. They also may transmit such sequences during their assigned time slots in order to be discovered by other WTRUs. Periodic discovery may be designed to assist the WTRUs in finding all discoverable WTRUs in their proximity. A discovery/measurement report 512 from one of the WTRUs may be produced that shows that WTRU1 501 and WTRU2 502 are in radio proximity, and the eNB can coordinate to setup an explicit measurement process in order to produce reliable layer 3 (L3) measurements. The MME 505 may also send the identities of the WTRU1 501 and WTRU2 502 via a message 513A to the eNB 503 and via a message 513B to the D2D server 506.

The network may alternatively enable triggered discovery. For example, WTRU1 501 and WTRU2 502 may be configured to discover each other by being provided each other's device addresses as well as discovery transmission patterns. This mode may enable the WTRUs to discover each other much faster. The network may enable this triggered discovery mode after ensuring that WTRU1 501 and WTRU2 502 are capable of D2D communication. Location or other information may be used for triggered discovery. For example, discovery may be triggered when the WTRUs become connected to the same or geographically adjacent eNBs. Alternatively, discovery may be triggered by a Non-LTE other-RAT, such as Wi-Fi Direct. Triggered discovery may include the opportunity for repetitive measurements of each WTRU's direct path links, so that a reliable measurement report 516A and 516B may be generated after layer 3 (L3) filtering 515 over multiple individual measurements.

Following discovery, WTRU1 501 and WTRU2 502 may receive measurement configurations 514A and 514B that include extensions for direct path measurements and may be under control of the eNB 503. Elements or extensions to existing elements in MeasConfig IE may be defined for D2D specific measurements. These elements may include at least one of: MeasObjectD2D or ReportConfigD2D. In the measurement configurations 514A and 514B the network may provide carrier frequencies for out-of-band measurements or measurement gaps for in-band measurement occasions of the D2D link.

The WTRU1 501 and WTRU2 502 may respond to the measurement configurations 514A and 514B by sending the measurement reports 516A and 516B to the eNB 503. Once the measurement reports are received, the decision to offload from the infrastructure path to a direct path may be based on the measurement reports 516A and 516B. Measurement thresholds may also be configured based on which offload decision is taken. An offload may be triggered based on a single WTRU's measurement, or alternatively the eNB may wait for the other WTRUs' reports. For example, the network may determine that a direct path may be configured as a function of the reception of a measurement report 512 applicable to a direct path between two or more WTRUs when at least one such report is received by at least two WTRUs within a given period of time.

Network controlling entities may determine the direct path capabilities of the WTRU1 501 and WTRU2 502. For example, the eNB 503 may communicate with the D2D server 506 through the MME 505 in order to make a WTRU D2D capability request 517A and receive a WTRU D2D capability response 517B in order to then obtain the optimal D2D configuration. The D2D capabilities may include, among other things, the bands/channels in which the WTRUs are capable of performing direct path communication. A WTRU establishing a D2D session may be configured in a master or slave role. This role may impact the WTRU's behavior for D2D resource management, security, D2D access control, etc. A WTRU may be further configured to select D2D mobility procedures based on its current role. In a D2D group session, one WTRU may be configured in the master role.

WTRU1 501 and WTRU2 502 may receive the direct path configuration using the established RRC connection. The D2D configuration may be provided through RRCConnection Reconfiguration messages 518A and 518B. WTRU1 501 and WTRU2 502 may also be configured to acquire new filtering rules for the infrastructure and D2D paths from a NAS or RRC message (e.g. RRCConnection Reconfiguration message). In another example, WTRU1 501 and WTRU2 502 may receive NAS messages 519A and 519B from the MME 505. The WTRU1 501 and WTRU2 502 may respond by sending with NAS messages 520A and 520B to the MME 505. These messages may contain new uplink Traffic Flow Template (UL TFTs) to be used after D2D session establishment.

Following reception of the direct path configuration through RRCConnection Reconfiguration messages 518A and 518B and processing the RRCConnection Reconfiguration messages 518A and 518B, WTRU1 501 and WTRU2 502 may trigger establishment of the corresponding D2D links. WTRU1 501 and WTRU2 502 may exchange handshake signals 521 on the direct path that may be at the physical layer. Upon reception of these handshake signals 521, the WTRUs may transmit RRCConnection Reconfiguration Complete messages 522A and 522B to the eNB, and may be ready to receive and transmit data in a D2D session.

A new set of IP addresses may be used for the D2D session. This set of IP addresses may belong to a different subnet than the infrastructure path. D2D WTRUs may be configured to acquire D2D IP addresses from the ProSe server. In another solution, a WTRU configured as a D2D session master WTRU may be configured to act as a local DHCP server and may assign the IP addresses related to this D2D session.

The infrastructure path radio bearers as well as the EPS bearers pertaining to the flow that was handed over to the direct path may have to be managed. Applicable EPS RAB(s) may be removed from the S1-u applicable to the concerned WTRU. The infrastructure path radio bearers may be deleted. The EPS bearers may be reconfigured as pure D2D EPS bearers by deleting the S1 and S5 interface components.

The deletion of the S1-U bearers between the eNB and the S-GW, as well as the S5 bearer between the SGW and PGW 504 may be accomplished by a modification of the MME-Initiated Dedicated Bearer Deactivation procedure. This procedure as described in the baseline LTE system includes releasing the radio bearers between the WTRU and eNB as well, but that need not be done in the context of D2D bearer modification described herein.

Applicable EPS RAB(s) may be maintained for the S1-u applicable to the concerned WTRU. Alternatively, the infrastructure radio bearers may be retained to allow for the possibility of dynamic switching of the flows between direct path and infrastructure path. Traffic from a given service may be mapped to either path, for example such that multi-path transmission may be supported. The EPS bearers may be reconfigured as special D2D EPS bearers that have both the infrastructure path data radio bearers (DRBs) and the direct path DRBs associated with them.

Core network context for applicable EPS RAB(s) may be maintained, but the S1-u may be deleted. Alternatively, the EPS bearers associated with the service for the applicable D2D session for the concerned WTRUs in the Core Network may be maintained, but the S1-u communication path for those bearers may be torn down. Upon a switch back to infrastructure path, the bearers may be reactivated e.g. without the need for a WTRU to perform a NAS service request or NAS service update procedure.

Using the data path from WTRU1 501 to WTRU2 502, the following actions may be taken in order to ensure seamless offload of data transmission with RLC AM bearers:

WTRU1 501 and WTRU2 502 may suspend any DRB(s) applicable to a service associated with direct path for the uplink (UL), downlink (DL), or both and may then transmit a RRC Reconfiguration Complete messages 522A and 522B, respectively, to the eNB 503. The eNB 503 may then send explicit RRC messages 523A and 523B commanding WTRU1 501 and WTRU2 502 to stop infrastructure transmission respectively of any data that is to be redirected to the direct path. WTRU1 501 and WTRU2 502 may also receive a PDCP Status PDU in the DL for a DRB.

eNB 503 may also provide WTRU1 501 and WTRU2 502 with the current PDCP Status 524A and 524B respectively from eNB 503, thus informing WTRUs 501 and 502 of the sequence numbers of the last in-sequence PDCP PDU that was successfully received at eNB 503. This may enable WTRU1 501 and WTRU2 502 to ascertain the starting points (i.e. the PDCP SDUs) for the direct path transmission. The WTRU may receive data for the DRB.

eNB 503 may continue transmitting 525A any remaining data in its transmit buffer to WTRU1 501 and WTRU2 502. eNB 503 may continue to forward its received PDUs 525B from in sequence PDCP SDUs from WTRU1 501 and WTRU2 502, onward to the SGW/PGW 504.

After forwarding all the data to the SGW/PGW 504, eNB 503 may transmit an end marker packet on a GTP-U tunnel between the eNB 503 and SGW/PGW 504. An end marker may be forwarded using the GTP-U protocol through the GTP tunnels 526A of WTRU1 501 to the SGW/PGW 504 and then to eNB 503. An end marker may also be forwarded using the GTP-U protocol through the GTP tunnels 526B of WTRU2 502 to the SGW/PGW 504 and then to eNB 503. This forwarding of an end marker may be enforced by using private extensions in the end marker. These private extensions may be used to define additional functionality that may not be native to the GTP-U protocol. In baseline LTE procedures, the end marker functionality may be used for denoting a switch in the data path from source to target eNB, and thus may involve forwarding of end markers from the PGW to the eNB. In contrast, for direct path communication mobility the transmission/forwarding of end markers from source to target eNB may be through the PGW. It may also be possible that WTRU 501 and WTRU 502 belong to two different PGWs, and there may be no GTP tunnel connectivity between the PGWs. In that case, the end marker approach may not be used, and other means may be employed. This is discussed in more detail in the inter-PLMN case below. Reception of end markers may include but are not limited to the following: (1) sending an acknowledgment to the source eNB; (2) sending a signal to a WTRU to start transmitting and receiving on the direct path starting from indicated PDCP sequence number (SN) in the end marker.

The reception of the end marker at eNB 503 may be an indication that there may be no further data packets from eNB 503 pertaining to the radio bearer communication that is to be switched to the direct path (for example all the data associated with the infrastructure based radio bearer has been sent to the WTRUs 501 and 502). eNB 503 may complete transmission of any remaining data to WTRU1 501 and WTRU2 502, and may then send an acknowledgment for the receipt of the end marker to the eNB1.

eNB 503 may then command WTRU1 501 and WTRU2 502 to start D2D transmissions 527A and 527B respectively. A direct path call 528 transmission then may start from the appropriate PDCP PDU, which is the one after the last PDCP PDU in the sequence received by eNB 503 based on the PDCP status report. This procedure may ensure that WTRU1 501 and WTRU2 502 do not receive redundant or incorrectly ordered data from each other over the direct path. The new direct path call 528 transmissions may be from an existing PDCP SDU queue or may start from a different unrelated PDCP SN. For example the WTRU may start from SN=0, since they may now pertain to a new bearer configured with different ciphering mechanisms. A WTRU may also be configured to complete a data path switch (infrastructure to/from D2D) based on synchronization messages delivered by higher layers. For example if the D2D session is related to an existing IMS session and if the WTRUs are configured to use a different IP subnet, SIP messages such as INFO, re-INVITE, OK and ACK may be used to synchronize and complete the switch between the IP addresses.

Following establishment of the direct path call 528, eNB 503 may send a path switch request 529 to the MME 505. The SGW/PGW 504 may send modify bearer messages 530, and the eNB 503 may send messages to delete the infrastructure bearers 531A and 531B.

Figure 6A:
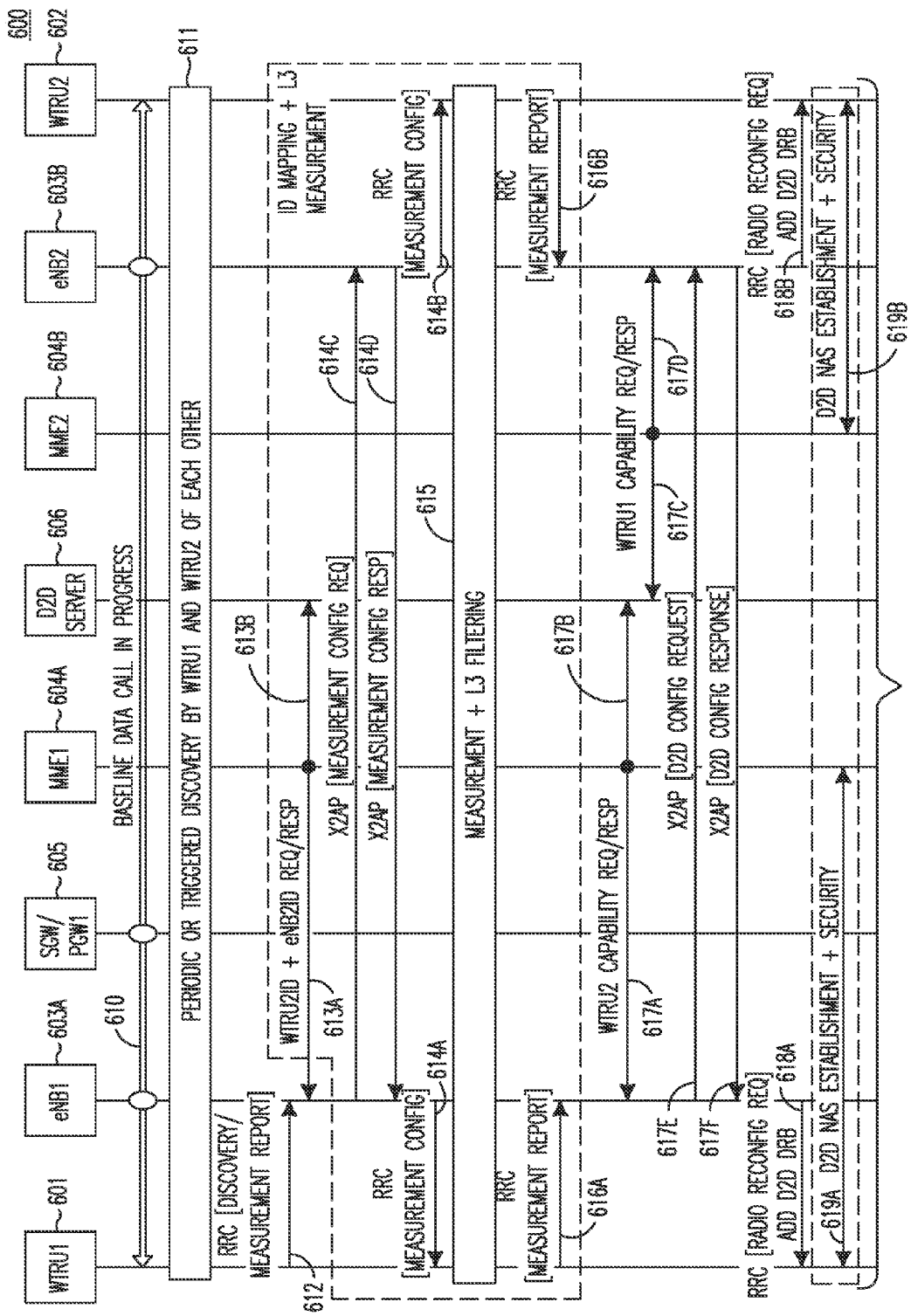
FIG. 6A is an example of infrastructure to LTE direct for the inter-eNB case.
Figure 6B:
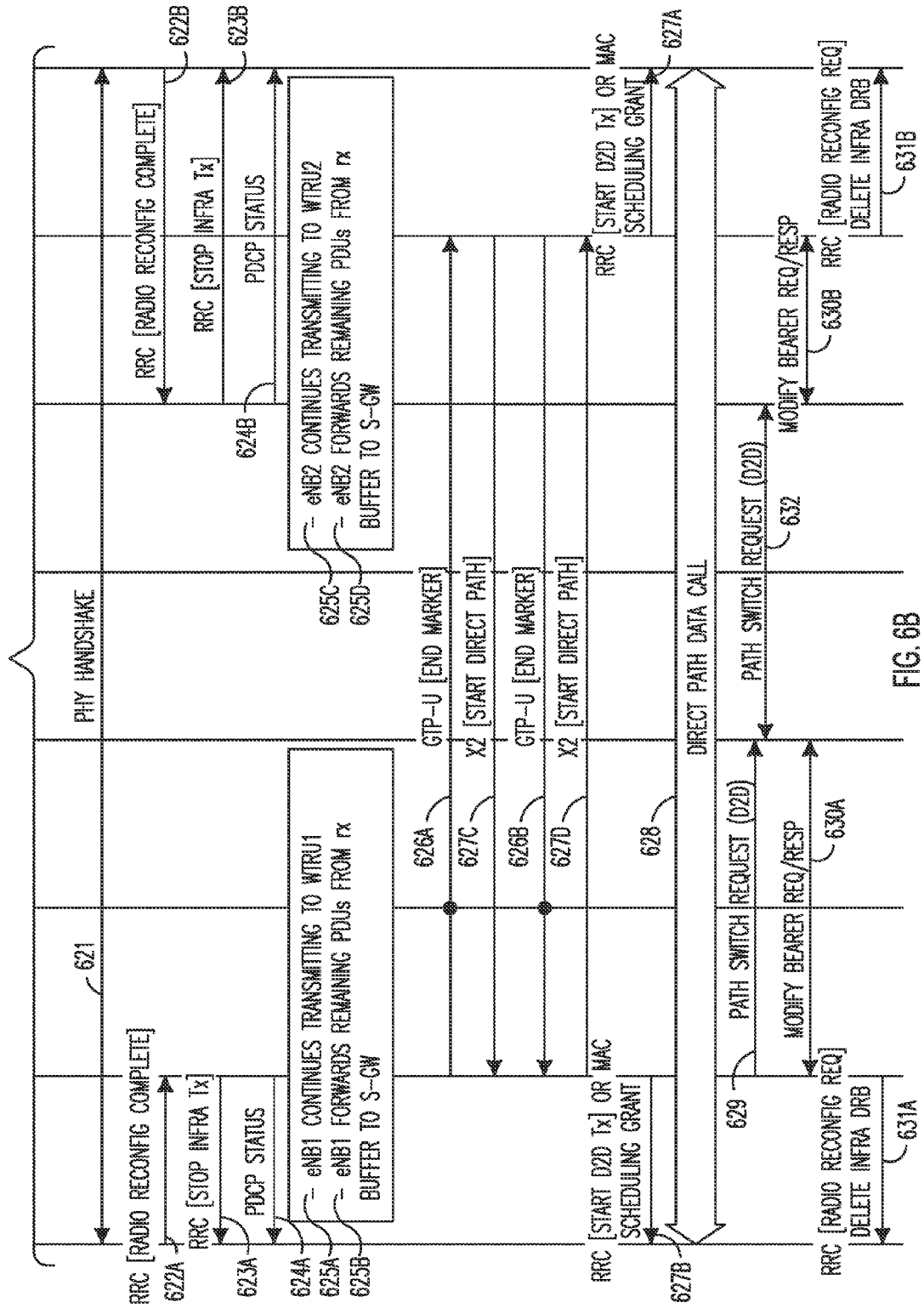
FIG. 6B is a continuation of the example of infrastructure to LTE direct for the inter-eNB case.

FIGS. 6A-6B is a high-level call flow diagram for a method 600 for the offloading of traffic for the infrastructure to LTE direct path offload scenario (Activation of Uu+CN Offload) for the inter-eNB case. In this mobility situation, WTRU1 601 and a WTRU2 602 may be connected to eNB1 603A and eNB2 603B, respectively, and engaged in a baseline call 610 with each other as shown in FIG. 6.

WTRU1 601 may begin offload of the baseline call 610 with WTRU2 602 to the LTE direct path with a periodic or triggered discovery process 611. In the periodic discovery process 611, a WTRU may look for discovery sequence transmissions by other WTRUs during pre-determined time instances. They also may transmit such sequences during their assigned time slots in order to be discovered by other WTRUs. Periodic discovery may be designed to assist the WTRUs in finding all discoverable WTRUs in their proximity. A discovery/measurement report 612 from WTRU1 601 may be produced that shows that WTRU2 602 is in radio proximity, and eNB1 603A may coordinate with eNB2 603B to setup an explicit measurement process in order to produce reliable layer 3 (L3) measurements. MME 604A may also send the identities of the WTRU1 601 and WTRU2

602 via a message 613A to the eNB1 603A and via a message 613B to the D2D server 606.

The network may alternatively enable triggered discovery. For example, WTRU1 601 and WTRU2 602 may be configured to discover each other by being provided each other's device addresses as well as discovery transmission patterns. This mode enables the WTRUs to discover each other much faster. The network may enable this triggered discovery mode after ensuring that WTRU1 601 and WTRU2 602 are capable of D2D communication. Location or other information may be used for triggered discovery. For example, discovery may be triggered when the WTRUs become connected to the same or geographically adjacent eNBs. Alternatively, discovery may be triggered by a Non-LTE other-RAT, such as Wi-Fi Direct. Triggered discovery may include the opportunity for repetitive measurements of each WTRU's direct path links, so that a reliable measurement report 616A and 616B may be generated after layer 3 (L3) filtering 615 over multiple individual measurements.

Following discovery, a WTRU may receive a measurement configuration. In WTRU1 601 may receive a measurement configuration 614A from eNB1 603A, and WTRU2 602 may receive a measurement configuration 614B from eNB2 603B. The measurement configurations 614A and 614B may include extensions for direct path measurements and are under control of eNB1 603A and eNB2 603B. New elements or extensions to existing elements in MeasConfig IE may be defined for D2D specific measurements. These new elements may include at least one of: MeasObjectD2D or ReportConfigD2D. In the measurement configurations 614A and 614B the network also may provide carrier frequencies for out-of-band measurements or measurement gaps for in-band measurement occasions of the D2D link.

The measurement configuration 614A and 614B may be exchanged over the backhaul interface. For the inter-eNB case, eNB1 603A and eNB2 603B may have to coordinate the configuration over the X2 interface by sending a measurement configuration request 614C and 614D to each other. If an X2 interface does not exist between eNB1 603A and eNB2 603B, they may coordinate via MME1 604A and MME2 604B respectively via S10 interfaces. eNB 603A and eNB 603B may also query the D2D server 606 in order to obtain the mapping between the WTRUs' device discovery identifiers and other identifiers such as the RNTI used during the infrastructure connection.

Alternatively, for the inter-eNB case, a single network node may determine the measurement configurations 614A and 614B. For example, the node that may subsequently allocate, configure and control the scheduling of the radio resources for the corresponding session and/or direct path may determine the measurement configurations 614A and 614B. Such network nodes may be selected as a function of the localization of the service such that the node is selected because of its coverage area. In the case of a plurality of WTRUs, the node that has the best radio link quality and manages the most WTRUs may be selected.

The WTRU1 601 and WTRU2 602 may respond to the measurement configurations 614A and 614B by sending the measurement reports 616A and 616B to the eNB 603A and 603B respectively. Once the measurement reports are received, the decision to offload from the infrastructure path to a direct path may be based on the measurement reports 616A and 616B. Measurement thresholds may also be configured based on which offload decision is taken. An offload may be triggered based on a single WTRU's measurement, or alternatively the eNBs may wait for the other WTRUs' reports. For example, the network may determine that a direct path may be configured as a function of the reception of measurement reports 616A and 616B applicable to the direct path between two or more WTRUs when at least one such report is received by at least two WTRUs within a given period of time.

Network controlling entities may determine the direct path capabilities of the WTRU1 601 and WTRU2 602. For example, the eNBs 603A and 603B may communicate with the D2D server 606 through the MME1 604A and MME2 604B in order to make a WTRU D2D capability request 617A and receive a WTRU D2D capability response 617B in order to then obtain the optimal D2D configuration. The D2D capabilities may include, among other things, the bands/channels in which the WTRUs are capable of performing direct path communication. A WTRU establishing a D2D session may be configured in a master or slave role. This role may impact the WTRU's behavior for D2D resource management, security, D2D access control, etc. A WTRU may be further configured to select D2D mobility procedures based on its current role. In a D2D group session, one WTRU may be configured in the master role.

WTRU1 601 and WTRU2 602 may then receive the Direct Path configuration using the established RRC connection. The D2D configuration may be provided through RRCConnection Reconfiguration messages 618A and 618B. WTRU1 601 and WTRU2 602 may also be configured to acquire new filtering rules for the infrastructure and D2D paths from a NAS or RRC message (e.g. RRCConnection Reconfiguration message). In another example, eNB1 603A may send D2D NAS establishment and security messages 619A to WTRU1 601 and MME 604A. Similarly, eNB2 603B may send D2D NAS establishment and security messages 619B to WTRU 602 and MME 604B.

These messages may contain new uplink Traffic Flow Template (UL TFTs) to be used after D2D session establishment.

Following reception of the direct path configuration through RRCConnection Reconfiguration messages 618A and 618B and processing the RRCConnection Reconfiguration messages 618A and 618B, WTRU1 601 and WTRU2 602 may trigger establishment of the corresponding D2D links. WTRU1 601 and WTRU2 602 may exchange handshake 621 signals on the direct path that may be at the physical layer. Upon reception of these handshake 621 signals, the WTRUs may transmit RRCConnection Reconfiguration Complete messages 622A and 622B to eNB1 603A and eNB2 603B respectively, and may be ready to receive and transmit data in a D2D session.

Using the data path from WTRU1 601 to WTRU2 602, the following actions may be taken in order to ensure seamless offload of data transmission with RLC AM bearers:

The WTRU may suspend any DRB(s) applicable to a service associated to Direct Path for the uplink (UL), downlink (DL), or both. WTRU1 601 and WTRU2 602 may then transmit a RRC Reconfiguration Complete message 622A and 622B respectively to eNB1 603A and eNB2 603B. The eNB1 603A and eNB2 603B may then send an explicit RRC message commanding WTRU1 601 and WTRU2 602 to stop infrastructure transmission 623A and 623B respectively of any data that is to be redirected to the direct path. The WTRU1 601 and WTRU2 602 may also receive a PDCP Status PDU in the DL for the DRB.

eNB1 603A and eNB2 603B may also provide WTRU1 601 and WTRU2 602 with the current PDCP Status 624A and 624B respectively from eNB1 603A and eNB2 603B, thus informing WTRU1 601 and WTRU2 602 of the sequence numbers of the last in-sequence PDCP PDU that was successfully received at each eNB. This may enable WTRU1 601 and WTRU2 602 to ascertain the starting points (i.e. the PDCP SDUs) for the direct path transmission. The WTRU may receive data for the DRB.

eNB1 603A may continue transmitting 625A any remaining data in its transmit buffer to WTRU1 601. Similarly, eNB2 603B may continue transmitting 626C data to WTRU2 602.

eNB1 603A may also continue to forward its received PDUs 625B from in sequence PDCP SDUs from WTRU1 601 and onward to the SGW/PGW 605. Similarly eNB2 603B may also continue to forward its received PDUs 625D from in sequence PDCP SDUs from WTRU2 602 and onward to the SGW/PGW 605. The network may use end markers between the source and target eNB 603.

After forwarding all the data to the SGW/PGW 605, eNB1 603A and eNB2 603B may transmit an end marker packet on a GTP-U tunnel between the eNBs and SGW/PGW 605. An end marker may be forwarded using the GTP-U protocol through the GTP tunnels 626A of WTRU1 601 to the SGW/PGW 605 and then to eNB2 603B. An end marker may also be forwarded using the GTP-U protocol through the GTP tunnels 626B of WTRU2 602 to the SGW/PGW 605 and then to eNB1 603A.

The reception of the end marker at eNB1 603A and eNB2 603B may be an indication that there may be no further data packets from the eNBs pertaining to the radio bearer communication that is to be switched to the direct path (for example all the data associated with the infrastructure based radio bearer has been sent to the WTRU1 601 and WTRU2 602). eNB1 603A may complete transmission of any remaining data to WTRU1 601, and eNB2 603B may complete transmission of any remaining data to WTRU2 602. eNB1 603A and eNB2 603B may then send each other acknowledgments for the receipt of the end marker over the X2 interface 627C and 627D.

eNB1 603A and eNB2 603B may then command WTRU1 601 and WTRU2 602 to start D2D transmission 627A and 627B respectively. A direct path call transmission 628 then may start from the appropriate PDCP PDU, which is the one after the last PDCP PDU in the sequence received by the eNBs based on the PDCP status report. This procedure ensures that WTRU1 601 and WTRU2 602 do not receive redundant or incorrectly ordered data from each other over the direct path.

Following establishment of the direct path call 628, eNB1 603A may send a path switch request 629 to the MME 604A, which MME 604A may forward the path switch request 632 to MME 604B. The SGW/PGW 605 may send modify bearer message 630A, and MME 604B may send modify bearer message 630B. eNB1 603A and eNB2 603B may send messages to delete the infrastructure bearers 631A and 631B, respectively.

In the case where eNB1 603A and eNB2 603B belong to different MMEs, additional communication may occur between the MMEs over the S10 interface in order to reconcile the D2D capabilities and policies as part of the offload process. In case there is no X2 interface between eNB1 603A and eNB2 603B coordination may occur via the MMEs through the S10 interface.

In the case where WTRU1 601 and WTRU2 602 belong to different PLMNs, there may be several additional factors to be consider before the offload from the infrastructure path to the direct path may be executed.

First, it may be very likely that the two WTRU operators use different frequency bands/channels for direct path communication. Hence, during the configuration of the direct path, the two PLMNs may have to agree on which direct path frequency may be used and provide this information to the WTRU1 601 and WTRU2 602 as part of the RRCConnection Reconfiguration messages 618A and 618B. It is also possible that different frequencies may be used for the two directions of the direct path. For example, there may be one frequency used for the WTRU1 601 to WTRU2 602 path and another for the WTRU2 602 to WTRU1 601.

In addition, the data from WTRU1 601 and WTRU2 602 may flow through two PGWs, which may belong to the same or different PLMNs. There may be no direct GTP-U tunnel between the PGWs and data may be routed as regular IP data, either through the public or a private internet cloud. In this situation, end markers may not be provided through the GTP-U protocol. In the absence of this mechanism, some other method may be used to determine the end of the transmissions from eNB1 603A and eNB2 603B and vice versa. One possible technique may be based on inspection of the TCP or IP header data in the packets from the WTRU users. Some header information may be conveyed between eNB1 603A and eNB2 603B over the X2 interface, and the target eNB may look for that information in the incoming packets from its SGW in order to determine the last packet.

An alternative methodology may be to simply switch from infrastructure to direct path without accounting for all the packets that are en-route in the infrastructure path. In this scenario, the TCP layer may handle out-of-sequence events as it normally would.

Figure 7:
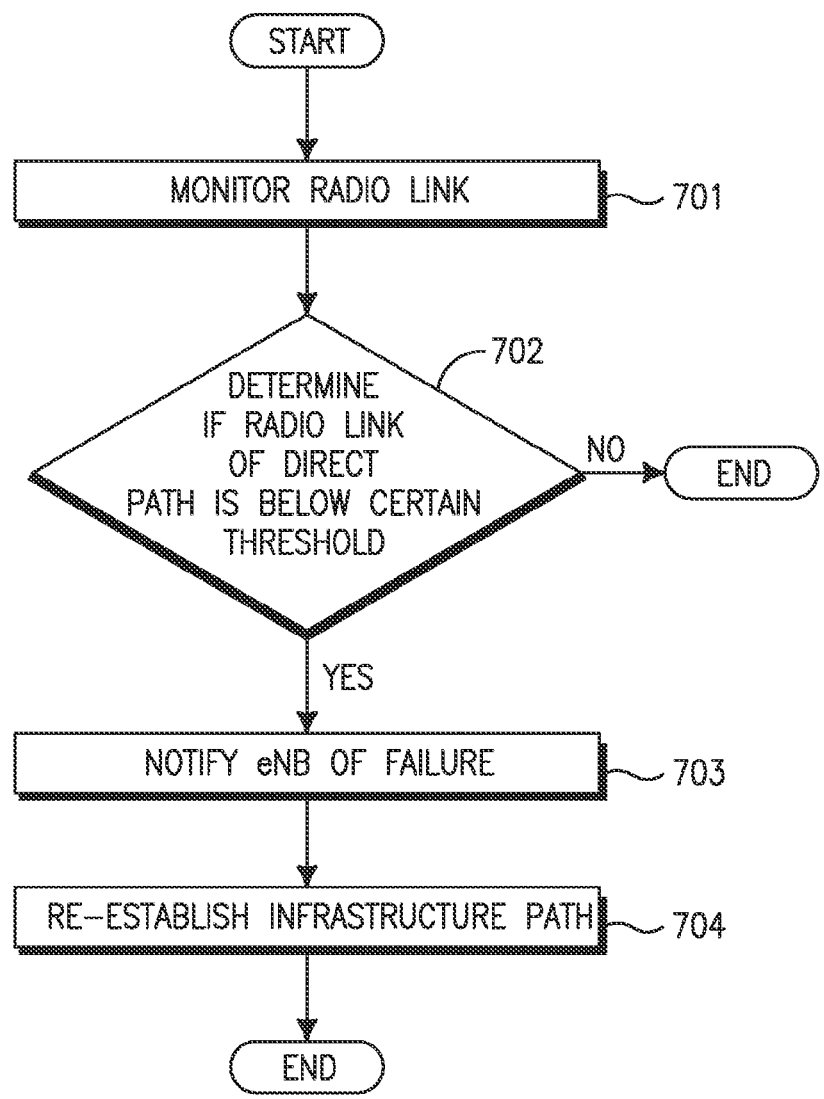
FIG. 7 shows a flow chart of an example in which the WTRU has the capability to recognize a failure to activate the direct path.

FIG. 7 shows a flow chart in which the WTRU has the capability to recognize a failure to activate the direct path 700. The offloading process (e.g. the establishment and/or activation of the direct path) may fail for some reason. The WTRU may monitor the radio link during the offloading process 701. The WTRU may then determine that the offload failed. One method for determining a failure includes but is not limited to determine that the radio link quality of the direct path is below a certain threshold, 702. Other methods may include determining that the direct path is in a state of radio link failure or that security has not been successfully activated. Unsuccessful security activation includes but is not limited to failure to authenticate a transmission from another WTRU of the same session and/or direct path, or repeated header compression failure. The WTRU may determine such a failure after a certain configurable time such as from the expiration of a timer that is started at the beginning of the offload procedure, or after reception of the reconfiguration message, or after the transmission of the message that indicates completion of the reconfiguration procedure.

When a WTRU determines that the process is unsuccessful, the WTRU may initiate a procedure to re-establish the session over the infrastructure path. Offload failure timers, different from but equivalent to T304, may need to be defined in order to account for different air interface, network and processing delays associated with the infrastructure to direct path offload process. Once the WTRU determines a failure occurred, the WTRU may notify the eNB of the failure 703 and then re-establish the infrastructure session 704.

Figure 8:
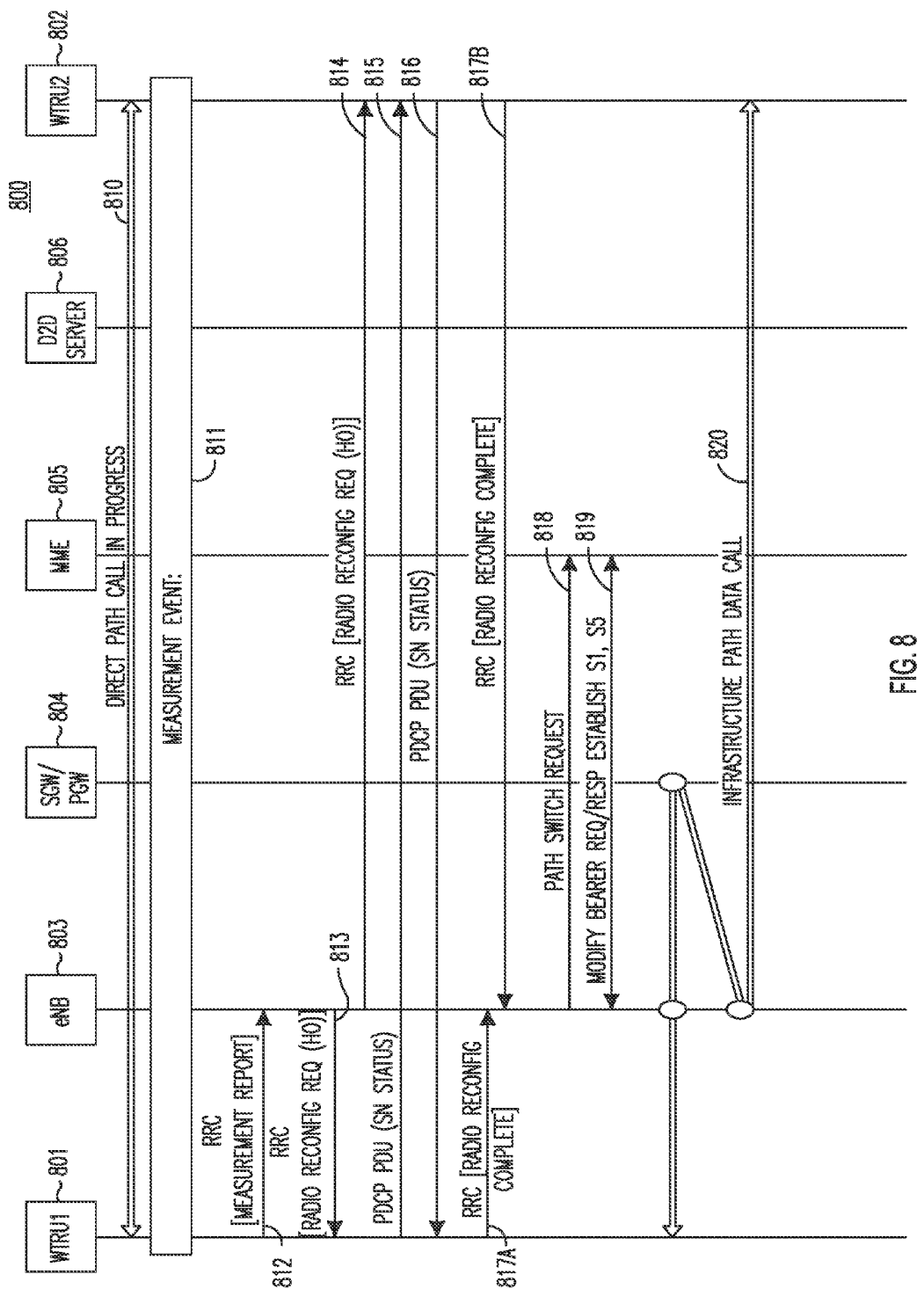
FIG. 8 is an example of an LTE direct path to infrastructure for the intra-eNB case.

FIG. 8 shows a high-level call flow diagram for mobility procedures 800 in the intra-eNB case for offloading from the LTE direct path to the infrastructure path. WTRU1 801 and WTRU2 802 may be connected in a direct path call 810. Because WTRU1 801 and WTRU2 802 may already have connectivity to the eNB 803, they may already have established signaling and data radio bearers for the infrastructure path. Appropriate NAS and AS security information may already have been provided to the WTRUs as well.

During the course of direct path call 810 via a D2D server 806, WTRU1 801 and WTRU2 802 may constantly monitor the quality of the direct path radio link. If there is any deterioration, a measurement event 811 may be triggered which may cause WTRU1 801 or WTRU2 802 to trigger an RRC measurement report 812 to eNB 803 in response to the measurement event 811. eNB 803 may make the decision to switch the communication to the infrastructure path and initiate the offload process. eNB 803 may send RRC Reconfiguration request messages 813 and 814 to the WTRU1 801 and WTRU2 802, respectively. As part of the offload process, new DRBs may be created, whose configuration takes into account both eNB 803 and the capabilities of WTRU1 801 and WTRU2 802 on the infrastructure link. These new DRBs may use the security keys already available for the existing infrastructure path DRBs, or AS security may be freshly established.

Before switching from the direct path call 810, WTRU1 801 may send a PDCP Status PDU 815 to WTRU2 802 over the direct path. Similarly, WTRU2 802 may send a PDCP Status PDU 816 over the direct path. The PDCP Status PDUs 815 and 816 may inform each other of their respective last received in-sequence PDCP PDU. This may enable the WTRU1 801 and WTRU2 802 to continue transmission over the infrastructure path starting at the appropriate queue position in order to avoid any data loss. Following transmission of the PDCP Status PDUs 815 and 816, WTRU1 801 may send eNB 803 a RRCConnection Reconfiguration Complete message 817A, and likewise WTRU2 802 may send eNB 803 a RRCConnection Reconfiguration Complete message 817B. The direct path switch request 818 may also be sent to the MME 805 in the CN and result in the establishing S1 and S5 components to the EPS bearer corresponding to the modified data radio bearer 819. It may be noted that when the WTRU1 801 and WTRU2 802 are engaged in direct path communication only, there may be no corresponding EPS bearer elements either in the SGW/PGW 804, and in that case there are no corresponding S1 and S5 tunnels. Hence, a modified Dedicated Bearer Activation procedure may be used in order to setup these EPS bearer elements. The procedure may end with an established infrastructure path call 820.

The solution for mobility procedures involving a non-LTE RAT direct path may depend on the protocol architecture used for the particular RAT. Solutions include but are not limited to superimposing a 3GPP LTE protocol stack on a non-LTE RAT including the MAC and PHY. In this approach, the non-LTE RAT WTRU connection may share the same IP address as that WTRU's LTE connection, and this IP address may be assigned by the PGW which may serve as the mobility anchor, as defined in LTE.

The deviations required for the non-LTE RAT may include the RRC Configuration of the MAC and PHY for the direct path including but not limited to parameters specific to the non-LTE RAT. Similarly, measurements of the non-LTE RAT may have to be configured. The LTE network may be aware of many of the details of the non-LTE RAT configuration.

Figure 9:
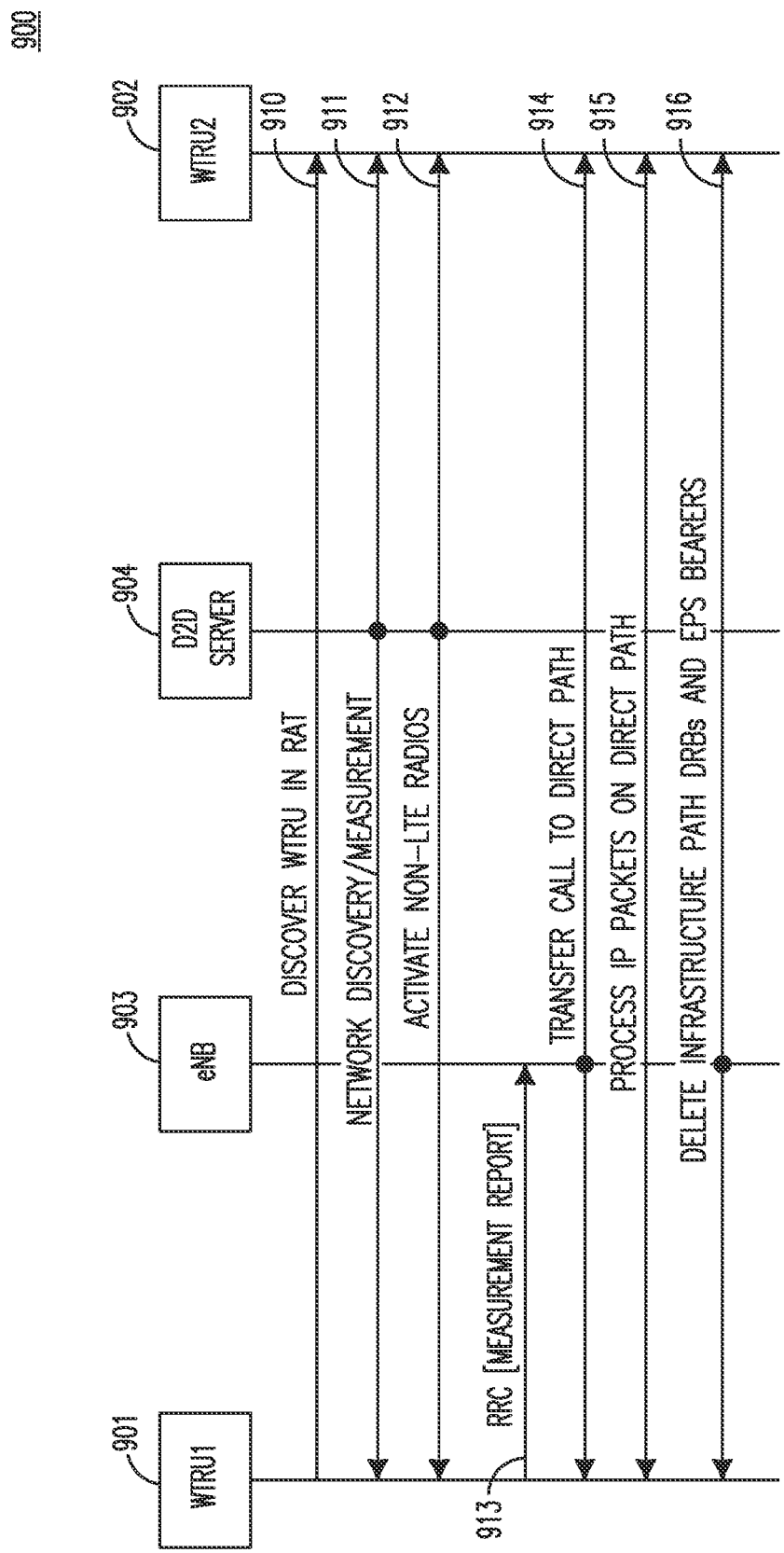
FIG. 9 shows a high-level call flow diagram for the offloading to the infrastructure path from a non-LTE RAT on the direct path.

Alternatively, the IP may be used directly on top of the non-LTE RAT MAC+PHY. In this solution, the non-LTE RAT's protocol may be completely disjointed from the LTE protocol stack. The eNB's RRC entity may not control the direct path communication, nor may the eNB take part in scheduling or resource allocation, in contrast to the LTE direct path described above. The WTRU's non-LTE RAT connection could have a different IP address, or it may have the same IP address as the LTE connection. In the latter case, the flow of traffic through the infrastructure path (LTE) or the direct path (non-LTE RAT) may be governed by the configuration of a logical interface (LIF). The LIF is an interface that hides the physical interface and the IP layer from each other, and was proposed to be used in the context of IP flow mobility. One approach as described below is that the 3GPP network can alter the configuration of the LIF using control plane signaling. In this configuration, the mobility procedures for infrastructure to direct path mobility may be summarized as follows:

FIG. 9 shows a high-level call flow diagram of a procedure 900 for the offloading to the infrastructure path from a non-LTE RAT on the direct path 900. WTRU1 901 may discover 910 WTRU2 902 either in LTE or in the non-LTE RAT. An LTE discovery may be followed by a non-LTE RAT discovery/measurement 911 triggered by the 3GPP network, such as by the D2D server 904. In addition, the D2D server or other 3GPP network entity may activate the non-LTE RAT radio 912 based on an LTE discovery or some other determination of proximity, such as when WTRU1 901 and WTRU2 902 are connected to the same or adjacent eNBs. Some information regarding the radio parameters of the non-LTE RAT may also be provided by the 3GPP network to facilitate efficient discovery. WTRU1 901 may send to eNB 903a measurement report 913 including the non-LTE RAT channel quality.

The eNB may decide to transfer the communication to the direct path 914. The configuration of the direct path may consist of providing the appropriate logical interface as discussed above. This procedure may be analogous to an IP routing table update.

The non-LTE RAT protocol stack may process IP packets on direct path 915 that may arrive from the application in WTRU1 901 or WTRU2 902. The relevant infrastructure path DRBs and EPS bearers 916 elements may be deleted. For direct path to infrastructure offload, the reverse process may be followed. A measurement event from WTRU1 901 or WTRU2 902 that may indicate that the infrastructure path might be higher quality than the direct path leading to a reconfiguration of the LIF and a setup of the appropriate radio and EPS bearers.

Figure 10:
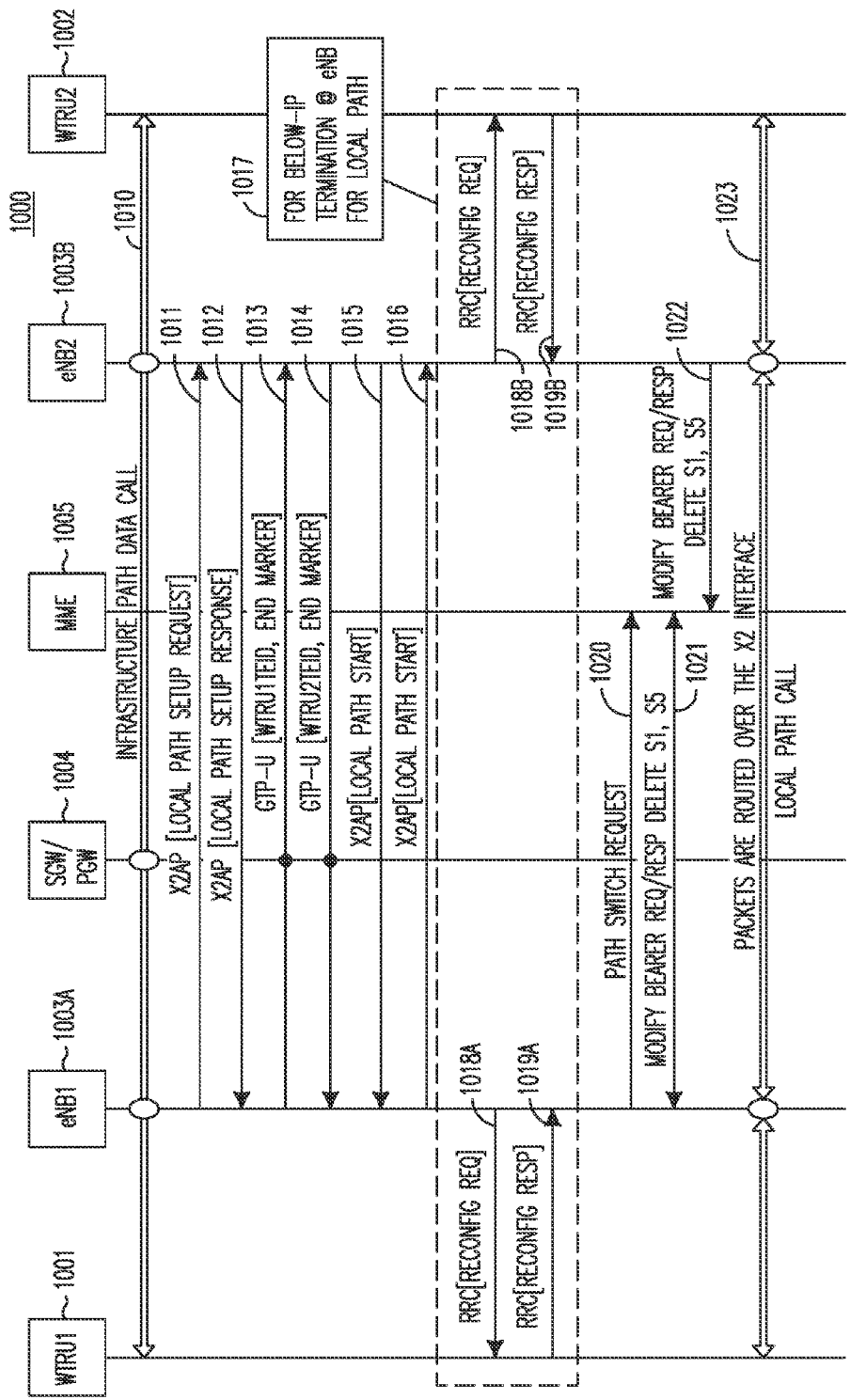
FIG. 10 is an example of an infrastructure to local path for the inter-eNB case.

FIG. 10 shows a high-level call flow diagram for a method 1000 of offloading from the infrastructure path to the local path. The offload from infrastructure to local path may transparent to WTRU1 1001 and WTRU2 1002. A D2D server may not have role in this offload when there are no direct over the air links involved. Both the intra-eNB and inter-eNB procedure is described herein.

WTRU1 1001 and WTRU2 1002 may be connected in an infrastructure call 1010, through eNB1 1003A and eNB2 1003B, respectively. When the decision to offload to a local path is made, eNB1 1003A may make a local path setup request 1011 to set up a local path over the X2 interface to eNB2 1003B. After receiving a local path setup response 1012, eNB1 1003A may stop forwarding additional packets to the SGW 1004, and transmit an end marker 1013 over the GTP-U tunnel. This end marker reaches eNB2 1003B, which may send an acknowledgement to eNB1 1003A over X2 in the form of a Local Path Start 1015 message. Similarly, eNB2 1003B may stop forwarding additional packets to the SGW 1004, and transmit an end marker 1014 over the GTP-U tunnel. This end marker reaches eNB1 1003A, which may send an acknowledgement to eNB2 1003B over X2 in the form of a Local Path Start 1016 message.

RRC Reconfiguration requests 1018A and 1018B may be sent from the eNB1 1003A to WTRU1 1001 and from eNB2

1003B to WTRU2 1002 respectively. WTRU1 1001 may send a RRC Reconfiguration response 1019A to eNB1 1003A. Similarly WTRU2 1002 may send a RRC Reconfiguration response 1019B to eNB2 1003B. A path switch request 1020 may be sent to the MME 1005. The MME 1005 may delete the S1, S5 link via messages 1021 and 1022 for the EPS bearers corresponding to the relevant DRBs. Alternatively, the eNBs may terminate the user data protocol stack below the IP layer 1017. For example the user data protocol stack may be terminated below the MAC layer. In this design, the PDCP/RLC transmissions may be between the WTRUs, and the eNB may act as a relay at the MAC layer.

A local path call 1023 may then commence and packets are routed over the X2 interface. The source eNB terminates the user packets at the IP layer and forwards them to the target eNB over the local path route.

The offloading from the local path back to the infrastructure path may involve the modification of the EPS bearer to include the S1 and S5 interface setup. An RRC reconfiguration may be required to switch from a below-IP termination to an IP termination at the eNBs, if applicable.

The procedure for local to LTE direct path offloading is similar to that for infrastructure path to direct path described above. Periodic or triggered discovery between the WTRUs may be followed by a radio reconfiguration for the direct path bearer. The data handling is simpler, since the local path over X2 may be used to transmit the equivalent of the end markers in the infrastructure case. This requires the definition of a new message over X2. Once these end markers are acknowledged, the direct path transmission may proceed.

Offloading from the LTE direct path to local path is similar to others described herein. The Path Switch option in this case is replaced by an option to create an X2 pipe for the data transfer if one does not already exist.

Offloads between LTE and non-LTE direct paths may happen when the WTRUs support both direct path options in their hardware configurations. The WTRUs may perform discovery and measurements of both direct paths in some pre-configured sequence. The device identifiers in both RATs and the mapping between them may be managed by the 3GPP network. Once the discovery/measurement report is provided to the eNB, the eNB may make the decision to offload the communication from one direct RAT to another. In the case of an LTE-compatible non-LTE RAT protocol, the procedure may become primarily an RRC Connection Reconfiguration procedure to change the radio bearer configuration. In the case of an LTE-incompatible non-LTE RAT, it may be desired to reconfigure the LIF and add/delete radio bearers and EPS bearers.

Figure 11A:
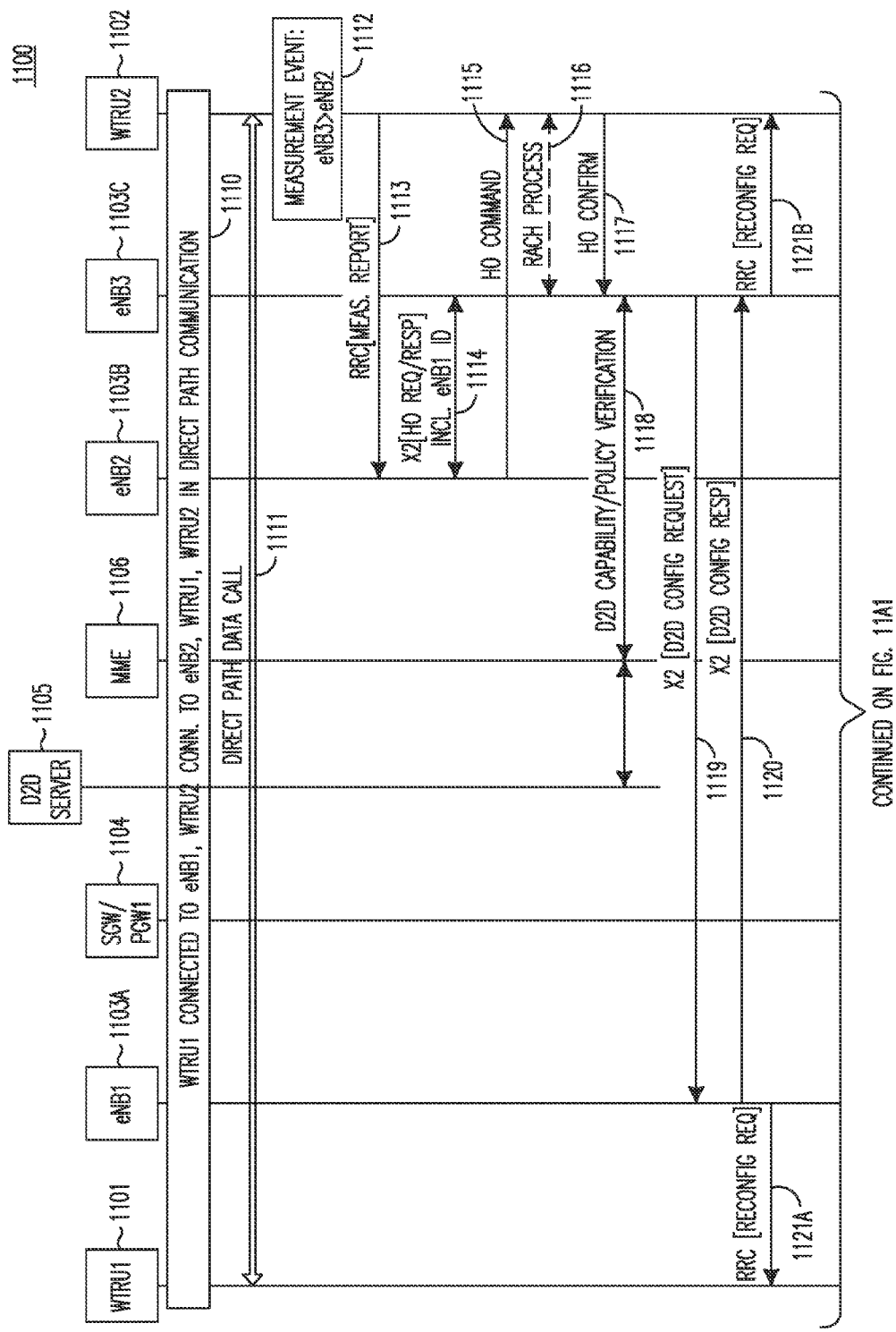
FIG. 11A is an example of infrastructure handover during direct path call.

Another mobility event type includes a change of serving cell (the handover scenario). FIGS. 11A-11A1 is a high-level call flow diagram for an infrastructure handover (HO) during a direct path communication 1100. The procedure in FIG. 11A-11A1 enables WTRUs to continue their direct path communication with minimal disruption. In the absence of this procedure, the WTRUs may have to close their direct path connection and re-establish it after the infrastructure handover is complete.

In this scenario WTRU1 1101 is connected 1110 to eNB1 1103A, and WTRU2 1102 connected 1110 to eNB2 1103B. A direct path call 1111 between WTRU1 1101 and WTRU2 1102 may be configured and may be in progress. A measurement event 1112 occurs when WTRU2 1102 moves closer to eNB3 1103C. WTRU2 1102 may send a measurement report 1113 to eNB2 1103B triggering a handover for the infrastructure path. eNB2 1103B may transmit a handover request 1114 to eNB3 1103C on the X2 interface and also may transmit the handover command 1115 to WTRU2 1102. Following receipt of the handover command, WTRU2 1102 may begin a random access channel (RACH) process 1116 and send a handover confirmation message 1117 to eNB2 1103B.

The handover request 1114 may also contain the current configuration of the direct path. Such configuration may include one or more identities. For example, such an identity may be that of WTRU1 1101, eNB1 1103A and/or a D2D session identity, which may also be referred to as a D2D communication identity. The eNB3 1103C may verify the WTRUs' D2D capabilities and D2D policies 1118 with the D2D server 1105 and MME 1106. eNB3 1103C may contact eNB1 1103A over X2 with a D2D configuration request 1119, and eNB2 1103B may respond with a D2D configuration response 1120. Once eNB1 1103A and eNB3 1103C have the D2D configuration negotiated, eNB1 1103A may send a RRC Reconfiguration request 1121A to WTRU1 1101, and eNB3 1103C may send a RRC Reconfiguration request 1121B to WTRU2 1102. The resultant configuration also depends on whether eNB1 1103A and eNB3 1103C establish a peer relationship or if one of the eNBs takes on a master role with respect to this particular direct path.

WTRU1 1101 and WTRU2 1102 may also provide each other with PDCP Status 1122A and 1122B respectively so that the communication can be continued at the appropriate queue position. The WTRUs may also receive signaling that triggers a discovery or proximity process as described above, which is useful in the case where the direct path requires reconfiguration of one or more physical layer parameters including but not limited to frequency or resource allocation. If the new direct path is in a different frequency band, then the WTRUs may tune to that new direct path frequency 1123A and 1123B respectively. WTRU1 1101 and WTRU2 1102 may then go through a PHY handshake process in order to re-affirm their direct path association in the new band.

WTRU1 1101 may then send a RRC Reconfiguration response 1125A to eNB1 1103A. Similarly WTRU2 1102 may send a RRC Reconfiguration response 1125B to eNB3 1103C. The direct path call 1126 may then be re-established.

A WTRU may also perform procedures triggered by a mobility event. Such mobility events include but are not limited to the following: a WTRU initiating a re-establishment of a D2D session back to the infrastructure path, a handover procedure in which a WTRU receives control signaling from the network that reconfigures the direct path used or that indicates mobility for the WTRUs' RRC connection, security reconfiguration and/or restart, and other similar events that may be considered as a transient state during a mobility procedure.

Figure 11B:
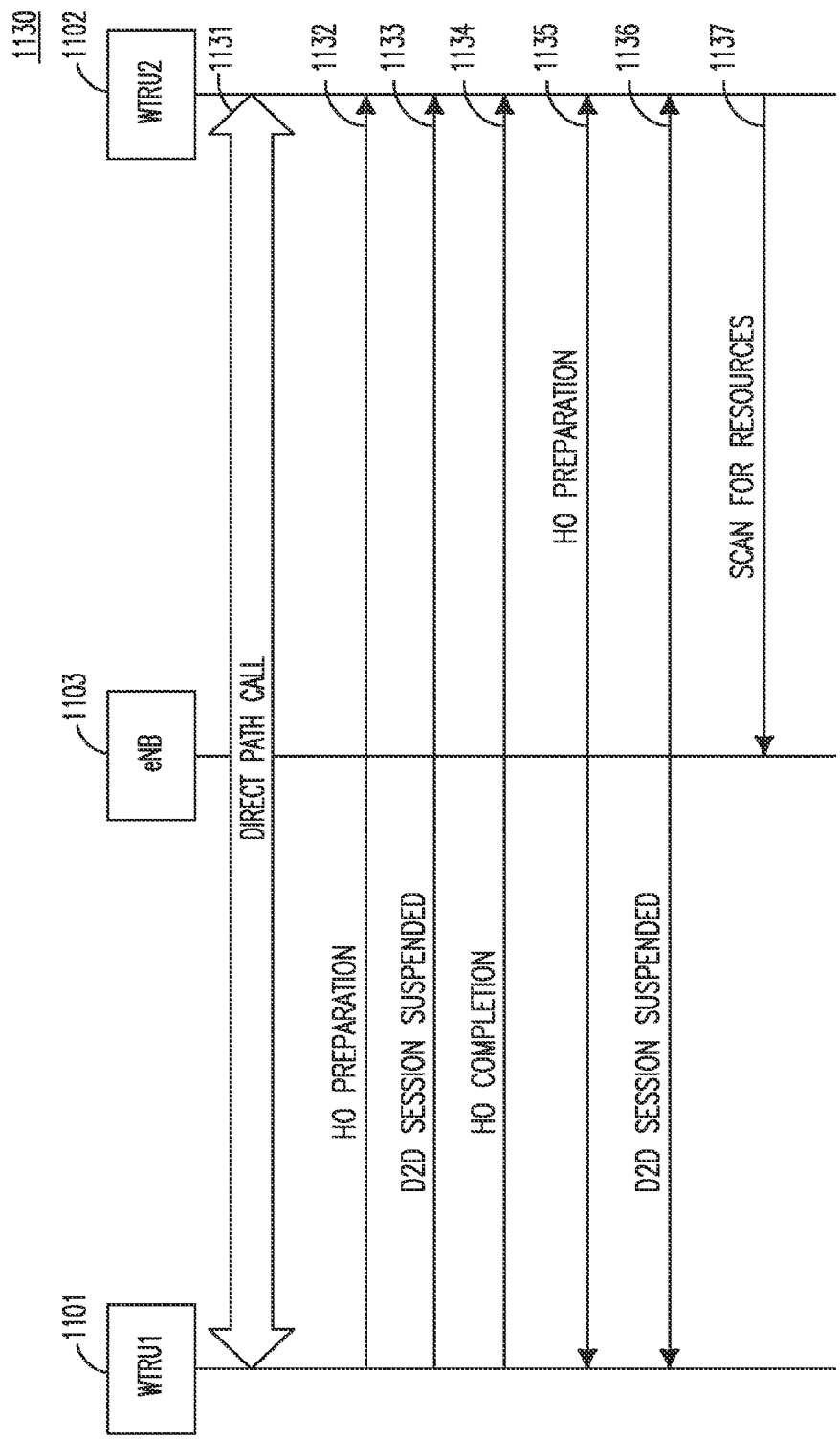
FIG. 11B shows a high-level call flow diagram for an example of the procedure a WTRU may perform during a handover.

FIG. 11B shows a high-level call flow diagram for an example of the procedure 1130 that a WTRU may perform during a handover. WTRU1 1101 and WTRU2 1102 may be involved in a D2D session such as a direct path call 1131. WTRU1 1101 may then inform WTRU2 1102 of its HO status by sending a HO preparation message 1132. WTRU2 1102 may also send a D2D session suspended message 1133 over the D2D link. Accordingly WTRU1 1101 may then suspend transmission and/or reception of data and control signaling on the D2D link. If D2D link access is distributed and common inter-cell resources are used for D2D channels (intra or inter band), WTRU1 1101 may continue the D2D session. Use of these messages by the WTRU1 1101 may be configurable. Alternatively or additionally, the HO preparation message 1135 or D2D session suspended message 1136 may be transmitted by the eNB 1103. WTRU1 1101 may also switch its master/slave configuration for the D2D session. WTRU2 1102 may also suspend any D2D transmission to WTRU1 1101 until it receives an indication that the procedure 1130 has completed, by receiving a HO completion message 1134 from WTRU1 1101 on the direct path link from the network.

If WTRU1 1101 was configured as the D2D session master, WTRU2 1102 may be configured to take over the master role for the session (e.g. in case of a 1-to-1 session) or, WTRU2 1102 may be configured to start a new master election with other WTRUs from the same D2D session (e.g. for a group session).

Semi-static D2D resources may be allocated for communication between the WTRUs. In this case a WTRU may consider the allocated resources to be invalid upon an indication of the start of mobility on the direct path. One solution may be that WTRU2 1102 considers allocated resources to be released once WTRU2 1102 receives the HO preparation message 1132. WTRU2 1102 may also be configured to scan for resources 1137 in order to obtain a new resource assignment from eNB 1103 for communications with WTRU1 1101. Another solution may be that allocated resources may be kept for a maximum duration (timer T1) and WTRU2 1102 may be configured to scan for the HO completion message 1134 on those resources. In the case where no message has been received at timer expiration then the resources may be considered as released. In an alternative solution, the HO completion message 1134 may be received from the network. WTRU2 1102 may reset the timing information related to WTRU1 1101 (as WTRU1 may itself update its timing reference in the target cell). This timing information may be related to a D2D timing advance, a reference time to open a Rx window for WTRU1 message reception, or the like.

Figure 11C:
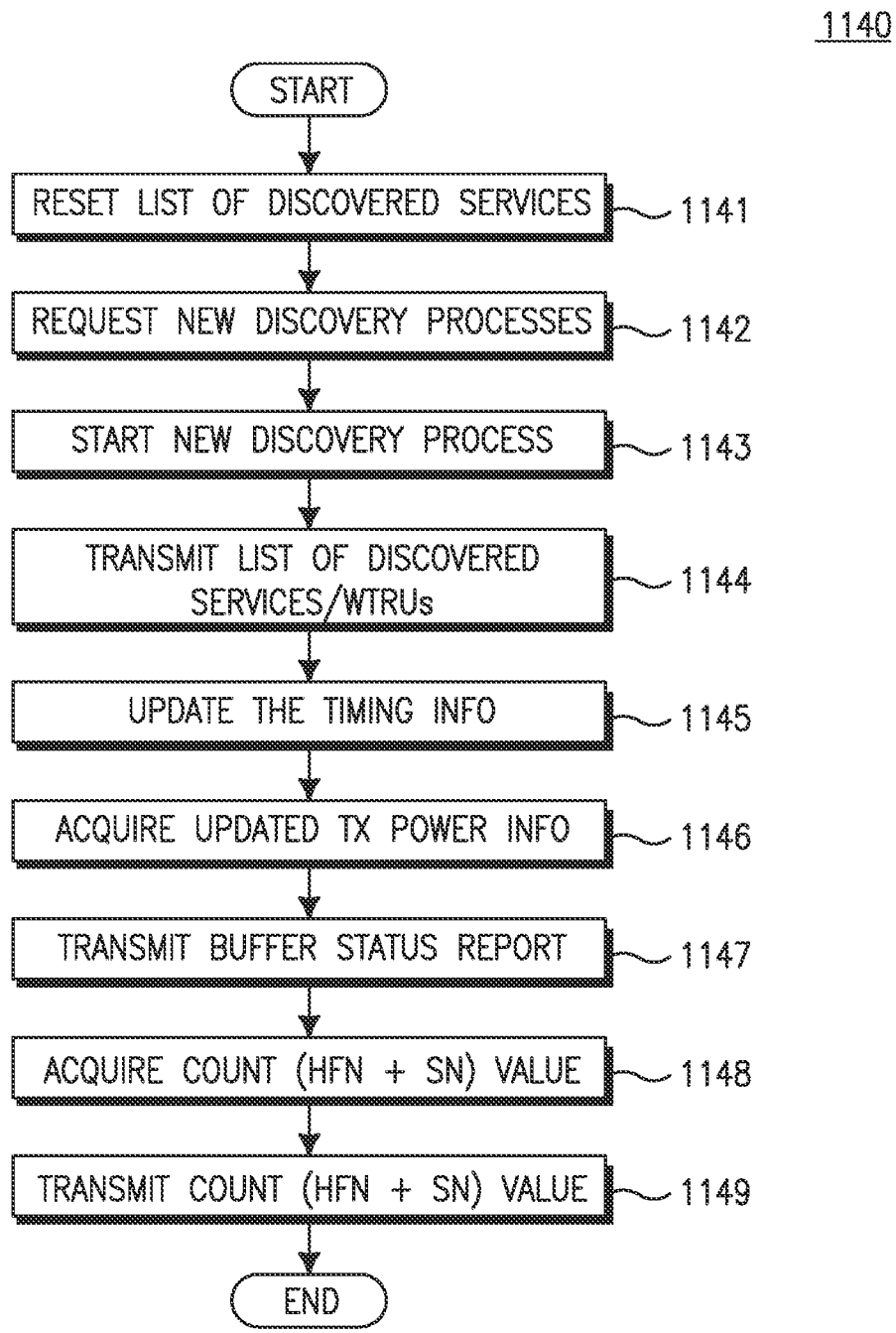
FIG. 11C shows a flow chart of an example of the procedure a WTRU may perform following the completion of a mobility procedure such as a handover.

FIG. 11C shows a flow chart of the procedure 1140 a WTRU performs following the completion of a mobility procedure such as a handover. The WTRU may reset its list of discovered services and D2D WTRUs, 1141. The WTRU may further request new discovery processes, 1142, from its serving eNB for one or more services which were discovered in the previous cell and/or were in an ongoing discovery process. Alternatively, the eNB may already know this list of services (communicated e.g. by the ProSe server or by the source eNB) and may directly configure the WTRU to start new discovery processes, 1143. The WTRU may maintain a list of discovered services/WTRUs from its former serving cell. After a HO, the WTRU may transmit the list of discovered services/WTRUs, 1144, of discovered services/WTRUs to its new serving cell. Alternatively, the eNB may already have this list as it may have been communicated by the ProSe server or by the source eNB. The WTRU may also update the timing information, 1145, for the direct path, which may be based on the timing advance acquired in the serving cell. The WTRU may acquire updated transmission power information, 1146, for the direct path, including but not limited to the maximum power value allowed in the cell. The WTRU may transmit a buffer status report, 1147, which may include the amount of data available for transmission for the D2D session and/or to request resources for transmission on a direct path. In the case of a multicast D2D session suspended during HO, the WTRU may acquire the COUNT (HFN+SN) value, 1148, associated with the data flow from a session master message or from its serving eNB so that it can resynchronize to the multicast traffic. Moreover, a session master WTRU may be configured to transmit the COUNT (HFN+SN) value, 1149, associated with the data flow to another WTRU, which may be the WTRU that may have previously indicated that it was performing a mobility procedure.

Figure 12:
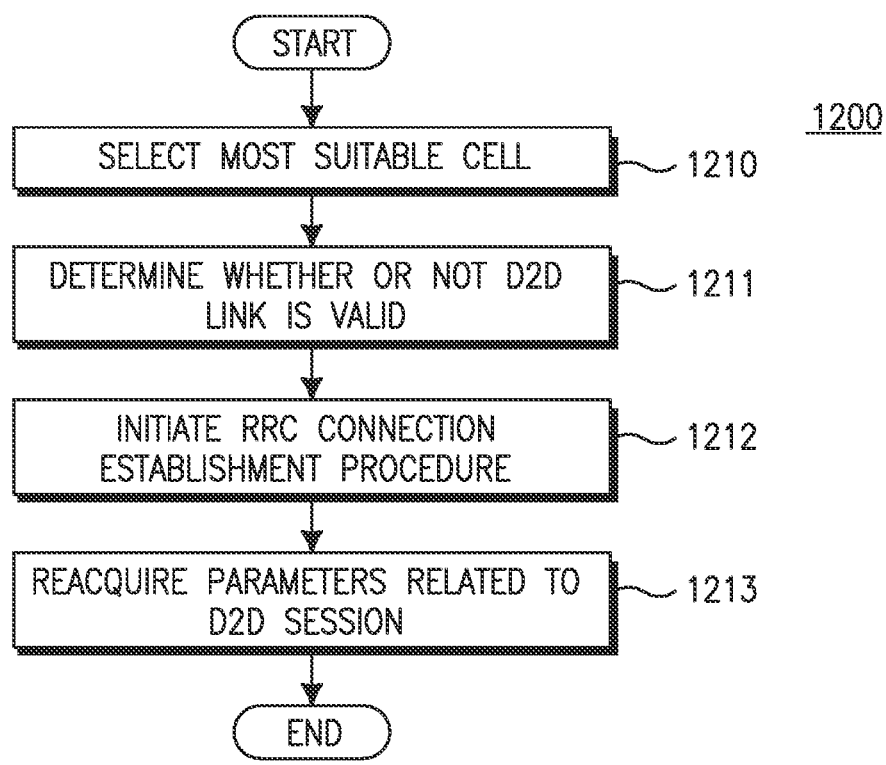
FIG. 12 shows a flow chart of an example method for the third mobility event type for cell reselection or IDLE mode mobility.

FIG. 12 shows a flow chart of an example method 1200 the third mobility event type which is cell reselection or IDLE mode mobility. A WTRU in RRC IDLE mode may be configured with a D2D session and/or service. For example, a WTRU may be receiving data transmissions on a D2D link, which was previously configured either by dedicated signaling before the WTRU moved to IDLE mode or configured from the reception of broadcasted signaling. The WTRU may reselect a different cell while in RRC IDLE. A WTRU in RRC IDLE mode may select the best suitable cell, 1210, as a function of the possibility of maintaining the D2D session. The WTRU may determine whether or not the D2D link is valid, 1211, in the selected cell. If it is not, the WTRU may initiate a RRC Connection Establishment procedure, 1212, in the selected cell, such that it may move from direct path to an infrastructure path. RRC Connection Establishment messages may be sent by the WTRU. The WTRU then may reacquire parameters related to the D2D session, 1213, such that a different D2D link may be used in the selected cell.

In each of three mobility event types described above, the WTRU and the network may have to measure and monitor the radio link and also manage any failures that may happen due to sudden deterioration of the links. During a D2D session, in addition to the infrastructure radio link failure (RLF) in baseline cellular networks, D2D systems are also prone to the additional case of direct path radio link failure, which may also be referred to as direct link failure (DLF).

Figure 13A:
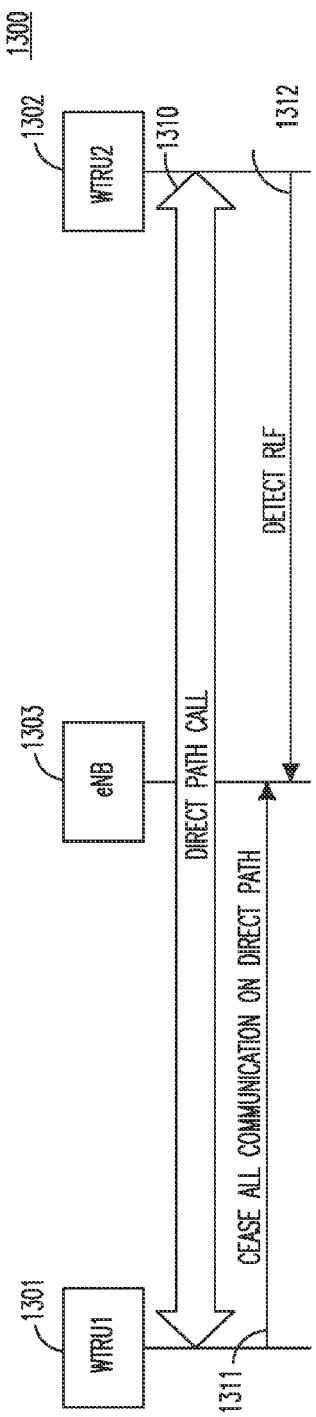
FIG. 13A shows a high-level call flow diagram by which a WTRU may handle radio link failure (RLF) failure in addition to undertaking the procedures described herein for baseline RLF handling.

When WTRUs are engaged in a direct path communication, the infrastructure radio link may fail. One example is when an RLF occurs. FIG. 13A shows an example method 1300 by which a WTRU may handle RLF failure in addition to undertaking the procedures described herein for baseline RLF handling. WTRU1 1301 and WTRU2 1302 are connected in a direct path call 1310. WTRU1 1301 may then immediately cease all communication on the direct path 1311. This may eventually lead WTRU2 1302 to detect a RLF 1312 on the direct link. In this case, allocated resources may be revoked 1313 by eNB 1303 upon Uu RLF.

Figure 13B:
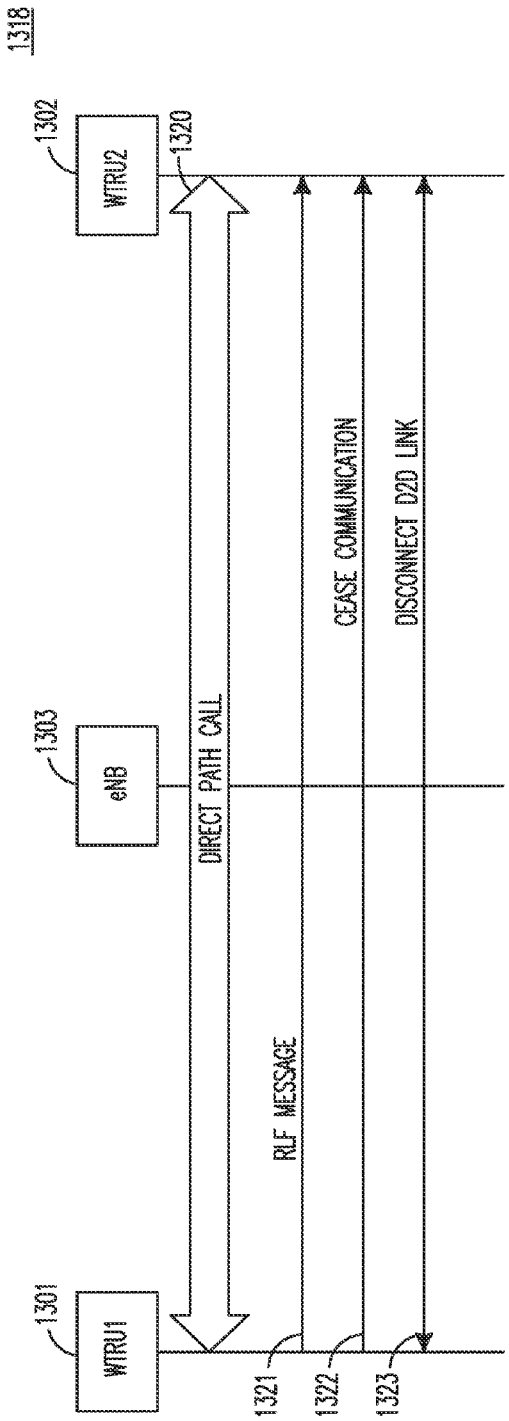
FIG. 13B shows a high-level call flow for another RLF handling procedure.

FIG. 13B shows a high-level call flow for another RLF handling procedure 1318. WTRU1 1301 may transmit a D2D link failure message such as an RLF message 1321 to WTRU2 1302 on direct path indicating RLF has occurred. WTRU1 1301 and WTRU2 1302 may then cease communication 1322 allowing for a graceful disconnection 1323 of the D2D link.

Figure 13C:
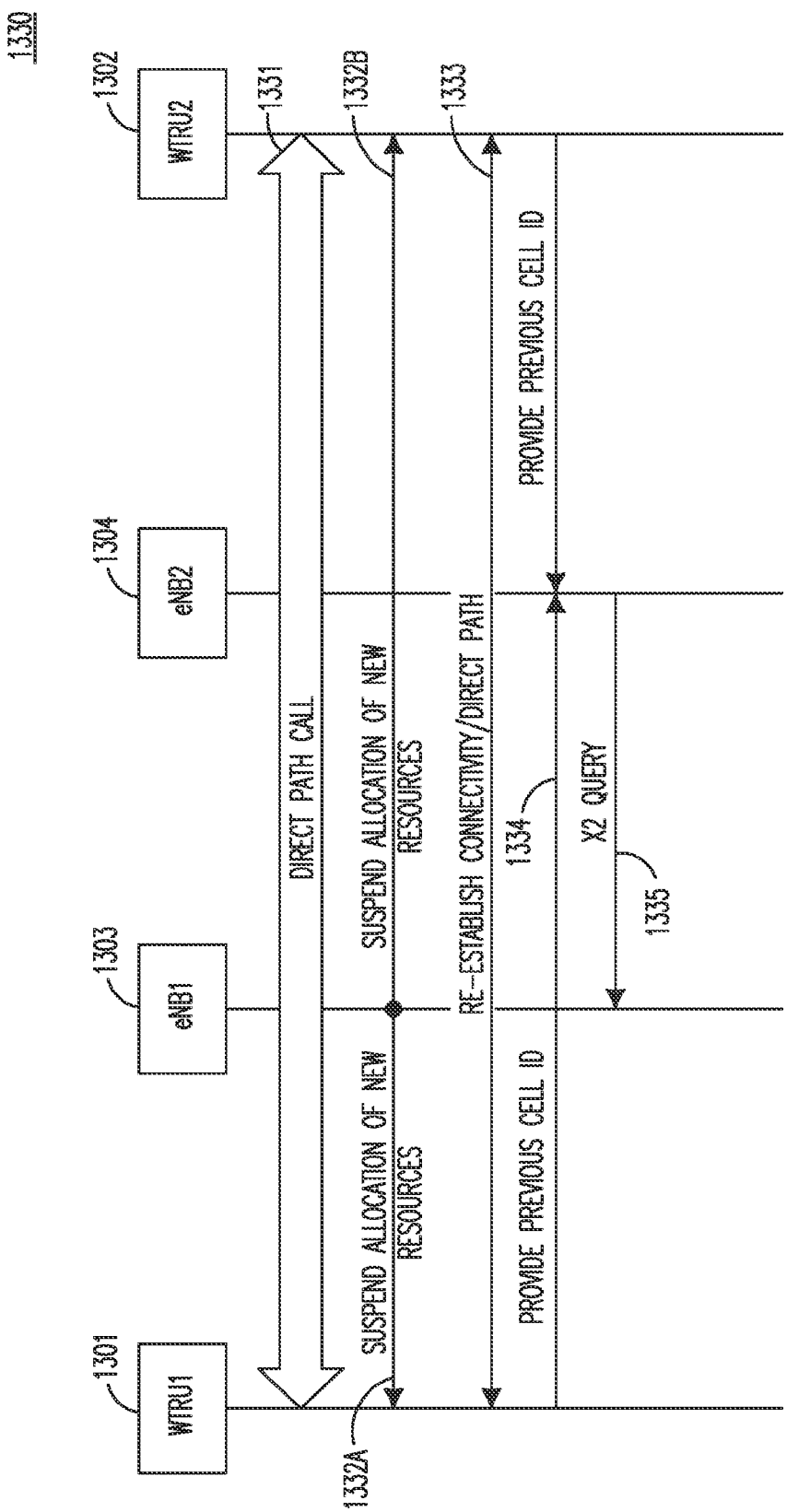
FIG. 13C shows yet another a high-level call flow diagram for handling RLF.

FIG. 13C shows yet another procedure 1330 for handling RLF. WTRU1 1301 and WTRU2 1302 may continue its direct path call 1331 for as long as its current grant of resources from eNB1 1303 allows it to do. eNB1 1303 may suspend allocation of new resources 1332A and 1332B for the direct path upon UL or DL failure. While the WTRUs are continuing their direct call 1331, WTRU1 1301 and WTRU2 1302 may re-establish connectivity to the network and/or re-establish the direct path 1333, which may use the last direct path measurement and the physical identity of the other WTRU as stored in the VarRLFReport IE. RRC re-establishment procedures may include notification information about any ongoing D2D session prior to detection of the RLF condition. As part of baseline RLF handling, WTRU1 1301 may go through a Connection Reestablishment procedure to re-establish the direct path 1333 if it is able to find an appropriate cell in a short period of time. In order to re-establish the direct path 1333, WTRU1 1301 and WTRU2 1302 may provide their previous physical cell ID 1334 to eNB2 1304. An additional field may be inserted in the RRC Connection Reestablishment Request that informs eNB2 1304 that a D2D call was also in progress. This may also enables eNB2 1304 to query 1335 eNB1 1303 over the X2 interface to obtain the previous D2D configuration, and possibly negotiate the new configuration. This may then be provided to WTRU1 1301 and WTRU2 1302 as part of the RRC Connection Reestablishment message, and the D2D call can continue.

Figure 14A:
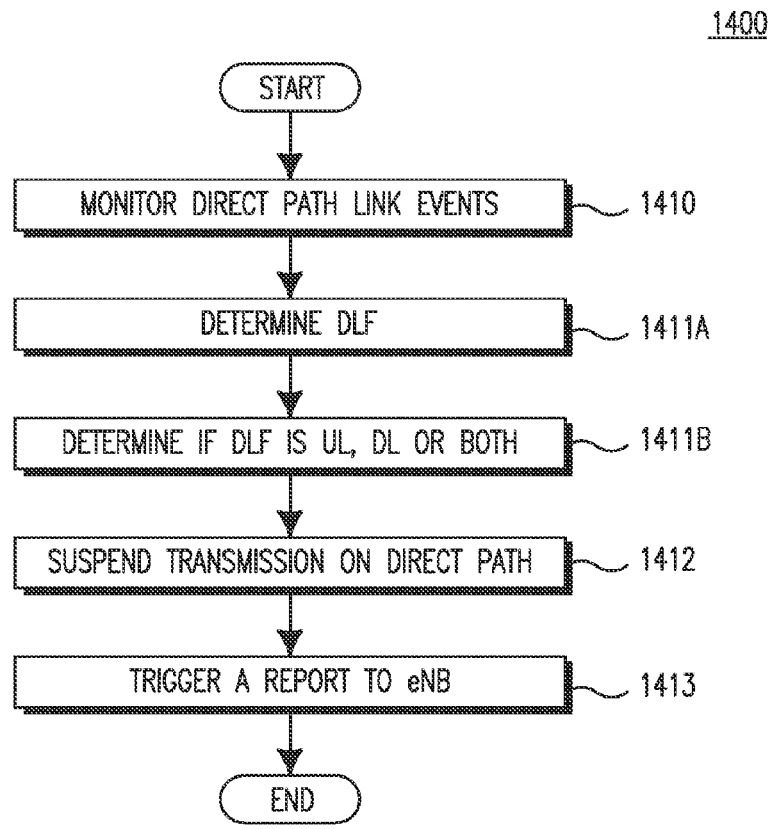
FIG. 14A shows a flow chart of an example for a procedure pertaining to direct link failure (DLF)

FIG. 14A shows a flow chart for a procedure 1400 pertaining to direct link failure (DLF) handling, which may also referred to as a D2D link failure. WTRU may monitor the direct path for various direct path link events, 1410. WTRU may then determine DLF, 1411A and suspend transmission on the direct path, 1412.

WTRUs in RRC Connected mode may trigger a report 1413 (either a measurement report, a DLF report, a proximity detection report) to the eNB and/or initiate a mobility procedure to continue the D2D session. The WTRU may suspend transmission on the direct path 1412 for the concerned D2D session until a valid transmission path is established for the D2D session.

For a WTRU that is transmitting in a D2D session on a direct link, it may determine if DLF on the UL, DL, or both, 1411B. For example, when the WTRU determines DLF 1411A and it precludes further transmissions, it may continue to attempt reception of transmissions with other WTRU(s) on the D2D link unless it is instructed otherwise by the network and/or while proximity is detected and/or while the D2D session remains valid. In another example, if the WTRU determines UL DLF only, it may continue attempting reception of transmissions on the direct path but suspend transmissions on the direct path until some condition is met. The condition may include but is not limited to the WTRU regaining a valid timing alignment, and/or the WTRU receiving RRC signaling that enables the WTRU to perform transmissions on the D2D link. The WTRU may also transmit data for the D2D session over the infrastructure path if possible based on the WTRU's configuration.

Alternatively or additionally, DLF may be indicated to the eNB by the WTRU when the WTRUs trigger a report, 1413. In one example, RRC signaling may be used by the WTRU such as a RRC connection re-establishment with cause indicating "direct path failure" or the like. The WTRU may still have connectivity on the infrastructure link and thus may use such signaling. The eNB may also enable communication to continue over the infrastructure path. Coordination of this process between eNBs over the X2 interface may be used in inter-eNB cases. This procedure is similar to a direct path to infrastructure handover described above. One deviation may be that the PDCP status cannot be exchanged between the WTRUs over the direct path due to the DLF, leading to a possibility of out-of-sequence or lost PDCP PDUs during the handover. An alternative may be to force the WTRUs to report the PDCP status to the eNB(s) over the infrastructure path and to communicate the same to the peer WTRU before completing the handover.

The WTRU may determine DLF according to direct path link events 1410 including but not limited to any of the following techniques:

According to a technique, physical layer out-of-synch indications for the direct path may be used. The WTRU may determine that the D2D link is experiencing failure when a number of consecutive out-of-sync indications is received from the physical layer for the direct path, e.g., where an out-of-sync is defined as a failure to receive reference signature sequences such as described in the physical layer. This number may be configurable.

According to another technique, RLC failure detection may be used. The WTRU may determine that the D2D link is experiencing failure when at least one RLC retransmission fails, or when a number of RLC retransmissions may have failed (e.g. a maximum RLC of retransmissions is reached). This number may be configurable. This may also apply when RLC retransmissions are defined as part of the direct path protocol functionalities. The WTRU may determine UL only DLF, DL only DLF, or UL and DL DLF in this case.

According to another technique, HARQ failure detection may be used. The WTRU may determine that the D2D link is experiencing failure when at least one (or a configured number) HARQ processes fails, and/or when a number of HARQ retransmissions may have failed (e.g. a maximum number of HARQ retransmissions is reached). This number may be configurable. This may be applicable when RLC is either not supported as part of the direct path protocol functionalities or not configured for the D2D session/D2D link. The WTRU may determine UL only DLF, DL only DLF, or UL and DL DLF in this case.

According to another technique, indications received from a peer on the direct path may be used. The WTRU may determine that the D2D link is experiencing failure when it receives an indication that one or more peer WTRUs are leaving the direct path communication and/or the D2D session, e.g. and the WTRU may detect that no other WTRUs are active for the session. This may be possible by considering only transmitting WTRUs in the session.

According to another technique, unsuccessful service discovery/proximity detection may be used. The WTRU may determine that the D2D link is experiencing failure when it determines that discovery/proximity detection for one or more WTRUs is unsuccessful. For example, such detection may be used periodically while the WTRU is active on the direct path, such that continued proximity may be evaluated. If the detection fails, the WTRU may determine that resources allocated by the NW for the Direct Path link are no longer valid. This may be possible when the WTRU detects that no other WTRUs are active for the session. This may be possible by considering only transmitting WTRUs in the session.

According to another technique, invalid session parameters may be used. The WTRU may determine that the D2D link is experiencing failure when it determines that resources allocated by the network for the direct path link are no longer valid. Examples include but are not limited to: time expiration of the validity of the allocated resources, detection of a change in scheduling information received for the serving cell that corresponds to the resources of the direct path in case D2D resources are allocated by broadcast signaling, by a broadcast channel dedicated to allocation of resources to D2D session and/or to direct path. The WTRU may determine UL DLF only in such case, in particular when the resources may have been allocated by dedicated signaling and/or were dedicated to the concerned WTRU only.

According to another technique, invalid security states may be used. The WTRU may determine that the D2D link is experiencing failure when it determines that there is a problem with security for the D2D link and/or for the D2D session. For example, the WTRU may determine that security activation has failed, that security state is no longer valid, or/and that security is no longer synchronized. The WTRU may also determine DLF according to at least one of the following events related to the infrastructure link and/or the established RRC connection.

According to another technique, RRC Connection state transitions may be used. The WTRU may determine that the D2D link is experiencing failure when it performs a transition to RRC IDLE for the connection with the infrastructure (e.g. such as upon reception of the RRC connection release). Possibly, the WTRU determines UL DLF only in such case.

Cell is no longer accessible to the WTRU: the WTRU may determine that the D2D link is experiencing failure when it determines that the serving cell that corresponds to the resources allocated to the D2D link is no longer accessible (e.g. the cell is barred for the WTRU's class, or the cell only accepts emergency services and the D2D session is no of such service class).

Uplink timing synchronization no longer valid: the WTRU may determine that the D2D link is experiencing failure when it determines that the uplink timing alignment for transmissions in the serving cell is no longer valid. The WTRU determines UL DLF only in such case.

The WTRU may also determine that a D2D session is failing/terminating when it detects at least one of but not limited to the following conditions: the WTRU determines DLF for the direct path, or any condition that may lead to it as described above; the WTRU determines that mobility failed (for example HO failed, or mobility for the direct path has failed; and the WTRU receives a RRC Connection Reconfiguration message with mobilityControlInformation IE (e.g. a HO command) that has no configuration for a direct path, and the WTRU was active with communications on a direct path in the source cell.

Figure 14B:
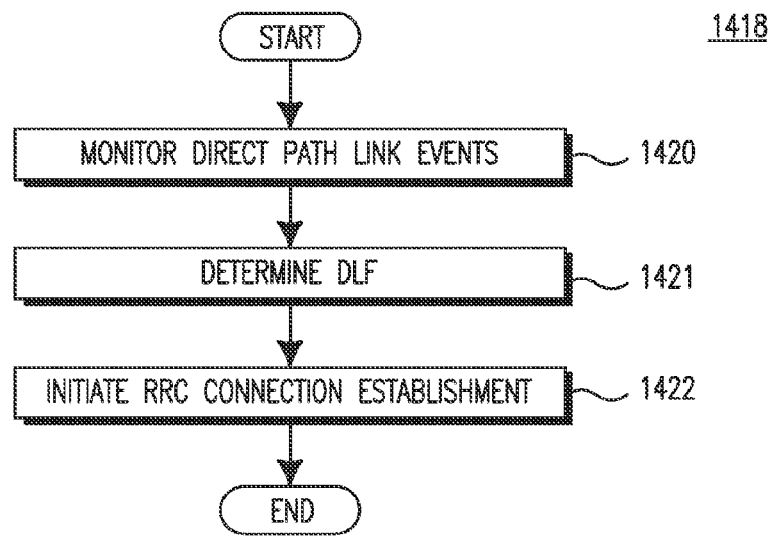
FIG. 14B shows another flow chart of an example for a procedure pertaining to direct link failure (DLF)

FIG. 14B shows another flow chart for a procedure 1418 pertaining to direct link failure (DLF) also referred to as a D2D link failure. The WTRU may be in RRC IDLE mode and may monitor the direct path for various direct path link events, 1420. The WTRU may then determine DLF, 1421, and initiate a RRC Connection Establishment, 1422, for the purpose of service continuity over an infrastructure path. RRC Connection Establishment messages may be sent by the WTRU.

Figure 15:
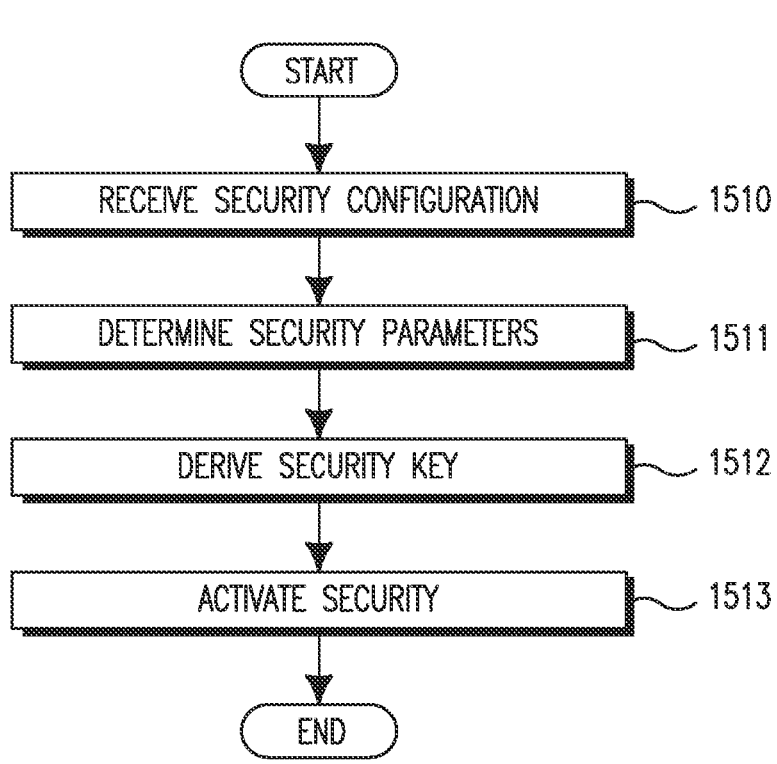
FIG. 15 shows a flow chart of an example for a security procedure for D2D communication.

In LTE systems, the WTRU may maintain a single security context, which is associated with an RRC connection. The WTRU may additionally maintain a security context associated with a D2D service, a D2D session, or a D2D link. These security contexts may include a number of security parameters, such as key and/or an encryption algorithm. FIG. 15 shows a flow chart for a security procedure for D2D communication 1500.

In D2D communication, a WTRU in CONNECTED mode may receive a session-specific security configuration, 1510, from the network, for example together with the configuration of the D2D link. Alternatively or additionally, a WTRU in CONNECTED mode and that is configured to transmit data in a session may provide its security parameters over the established infrastructure link, such that any WTRU that may be a receiver of a D2D session receives the security parameters and may subsequently apply those to any data received from that WTRU. For a session with a plurality of transmitting WTRUs, a WTRU that receives during the session may thus be configured with one security configuration 1510 per WTRU. For example, the receiving WTRU may use the identity of the transmitting WTRU to determine what security context to apply, if any.

The WTRU may then determine what security parameters, 1511, to apply as a function of the application. Alternatively or additionally, a WTRU may be configured by the application that generates data for the corresponding D2D session with relevant security parameters. Such parameters may be fixed (e.g. as part of the subscriber's information, service groups or the likes) or obtained by higher layers.

The WTRU may then derive the security key, 1512, using a specific set of keys, or key hierarchy. A WTRU may be configured to derive the security key for a D2D session based on one or a combination of an entity including but not limited to the following: $K_{ASME}$ (Access Security Management Entity) at the NAS level, $K_{eNB}$ at the AS level, $K_{ProSe}$ generated by the ProSe server (e.g. a key associated to the service); $K_{DirectPath}$ generated by the network (e.g. a key associated to the D2D link or D2D connection). For example, one or more of the above keys may be part of the security context of a D2D communication. The WTRU may then perform key derivation using the latter two parameters for encryption and authentication keys used for data and/or control signaling exchanged on a direct path.

For each of the above mentioned keys, the key validity may be associated with a geographical area. For example, the WTRU may perform security-related procedures. WTRU may use a key that is specific to a given D2D connection/link. A WTRU may be configured to derive a security key, 1512, for a D2D session at least in part using a $K_{eNB}$ Key, or more generally using a key that is associated with and/or assigned by one or more eNB(s). This security key may be referred to as a RAN key. It may be further configured to release a D2D session when it changes its serving cell if the $K_{eNB}$ is not valid anymore. In yet another example, it may be further configured to maintain the D2D session if it is configured as the session master or release it if it is configured as a session slave. In the case where the D2D session is maintained, the session master may be configured to request a key update based on the new $K_{eNB}$ from its serving cell.

The $K_{eNB}$ key may be associated to the physical resource of the direct path and/or of the D2D communication. The $K_{eNB}$ key may thus differ from the one used for the infrastructure path (i.e. it may be different from the key used for activating security towards the RAN). The key may be common to one or more eNBs including any eNB that may allocate a set of resources and/or control physical layer parameters or scheduling. The key may also be common to any WTRU that is involved including any WTRU that is actively transmitting and/or receiving on a set of resources for a given session and/or for a given direct path.

A WTRU may be configured to derive security key, 1512, for D2D at least in part by using a $K_{ASME}$ key, or by using a key that is associated with or assigned by the NAS layer. For example, this may be a CN key. It may be further configured to release a D2D session when it changes its serving MME because the $K_{ASME}$ may not be valid anymore. It may be further configured to maintain the D2D session if it is configured as the session master or release the D2D session if it is configured as a session slave. In the case where the D2D session is maintained, the session master may be configured to request a key update based on the new $K_{ASME}$ from its serving cell.

The $K_{ASME}$ key may be associated with a specific D2D session, service, and/or group of WTRUs sharing the same subscription and/or capabilities such as a Public Safety unit. The $K_{ASME}$ key may thus differ from the one used for the infrastructure path, and according it may be different from the key used by the WTRU to access network services. The key may be known by one or more network nodes. For example any eNB that may allocate a set of resources and/or control physical layer parameters or scheduling, and/or any WTRU that is involved in a D2D session and may be actively transmitting and/or receiving on a set of resources for a given session and/or for a given direct path.

The WTRU may use a key that is specific to a given D2D session. A WTRU may be configured to derive a security key, 1512, for D2D at least in part using a $K_{ProSe}$ key. In one solution, it may be further configured to release a D2D session when it changes its serving ProSe server because $K_{ProSe}$ may not be valid following the server change. It may be further configured to maintain the D2D session if it is configured as the session master or release it if it is configured as a session slave. In the case where the D2D session is maintained, the session master may request a key update based on the new $K_{ProSe}$ from its serving cell. In the case where the D2D session is maintained, the session master may be configured to request a key update based on the new $K_{ProSe}$ from its serving cell.

The $K_{ProSe}$ key may be associated with a specific D2D communication service. The key may be known by one or more network nodes such as any eNB that may allocate a set of resources and/or control physical layer parameters or scheduling, and/or any WTRU that is involved in a D2D session and may be actively transmitting and/or receiving on a set of resources for a given session and/or for a given direct path.

WTRU may use a key that is specific to a given D2D direct path. A WTRU may be configured to derive a security key 1512 for D2D from $K_{Directpath}$. The $K_{Directpath}$ key may be associated with a specific Direct Path. The key may be known by one or more network nodes such as any eNB that may allocate a set of resources and/or control physical layer parameters or scheduling, and/or any WTRU that is involved in a D2D communication session and may be actively transmitting and/or receiving on a set of resources for a given session and/or for a given direct path. The $K_{DirectPath}$ key may be valid only while the corresponding radio resources are valid.

If security with authentication is configured and if security requires activation, the WTRU may first activate security, 1513, when it receives data on the D2D link for which the WTRU may verify authentication using the algorithm and key retrieved from the security context. Security activation may be applicable for a D2D link when the security context is common to all transmitting WTRUs for the D2D link. It may also be common to a D2D session when the security context is common to all transmitting WTRUs in a session. Security activation may also be applicable per WTRU from which data may be received. Such authentication information may be present for any PDU received, or for specific PDUs. Such PDUs may be control PDUs exchanged over the D2D link, or any PDU with a specific sequence number (e.g. the first PDU in the session, or any PDU with a given period x such as corresponding to SN mod(x)=0). When the PDCP is configured for traffic exchanged on a D2D link, it may perform the security functions as described herein.

Failure to activate security, 1513, or security failure, may lead to service re-establishment as described herein. The WTRU may fail to activate security, or it may lose synchronization and fail to activate security, 1513. When the WTRU detects a failure, the WTRU may initiate a procedure such that the service may be re-established such as a new session setup, as a mobility event away from the direct path communication, or it may terminate the D2D session altogether as in the mobility event type procedures described herein.

When a mobility event occurs, the WTRU may perform at least one of the following: The WTRU may restart security which may include having the WTRU activate security, 1513, for the direct path and apply the new security configuration, 1510, to the first transmission after the security configuration, 1510, when a mobility event occurs. The WTRU may activate security, 1513, when the mobility event is from infrastructure to a transparent local path as detailed above, which may include transparent forwarding by the network when there is a path-specific security context. The WTRU may activate security, 1513, when the mobility event is from the infrastructure to direct path as detailed above. The WTRU may also activate security 1513 when the mobility event is from the direct path to the local path as detailed herein, including when the network decodes the data and sends it using the WTRU-specific security context or vice-versa.

Otherwise, the WTRU may continue security without any modification after the reconfiguration of the link. Such as when the mobility event is from infrastructure to local path including when the network decodes the data and sends it using the WTRU-specific security context or vice-versa. WTRU may also continue security without any when the mobility event is from direct path to a transparent local path as detailed herein, including when transparent forwarding is used by the network when there is a path-specific security context, or vice-versa.

Figure 16:
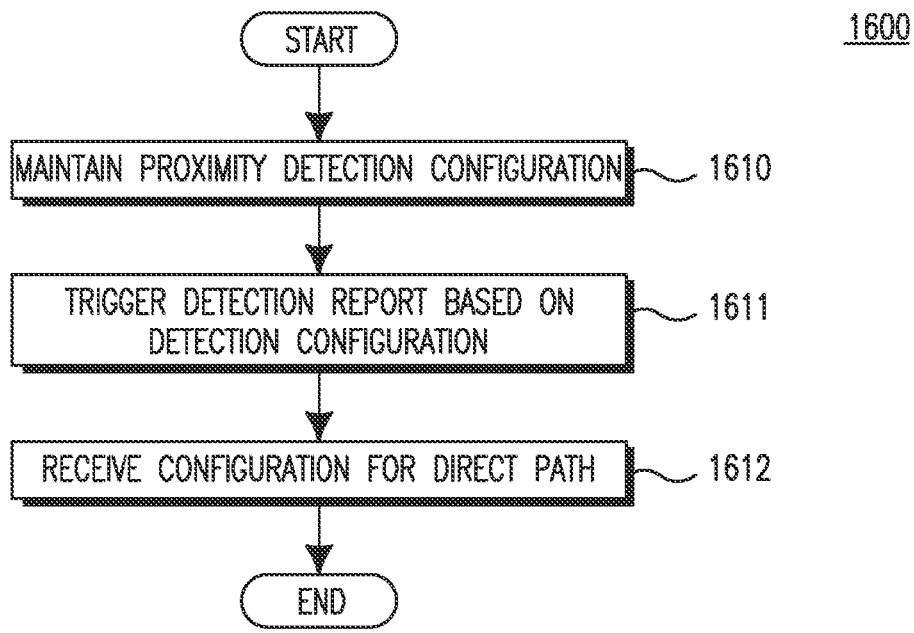
FIG. 16 shows a flow chart of an example for a procedure in which triggers for mobility and measurement events may be used.

FIG. 16 shows a flow chart for a procedure 1600 in which triggers for mobility and measurement events may be used. The WTRU may be configured with and maintain a proximity detection configuration, 1610, which may also be referred to as a measurement configuration. Such a configuration may include at least one measurement identity including but not limited to a measurement object linked to a measurement configuration and/or discovery signal properties. Measurements may be performed on transmissions received for the D2D link such as reference signals or on discovery signals associated with other WTRUs of the same D2D session, or on any other signals suitable for assessing link availability and/or link quality such as physical layer measurements described herein.

Measurement configurations and reporting for the direct path are described herein. In order to assist the reporting of D2D measurements by the WTRU to the eNB, additional IE(s), such as a MeasResultsD2D, may be added to the existing MeasResults IE. Other-RAT measurements may also be accommodated in this IE. Similarly, additions can be made to the ReportConfigEUTRA IE, or a separate ReportConfigD2D IE may be created in order to specify the measurement reporting configuration for D2D. L3 filtering parameters for the D2D measurements can be specified separately, say as a filterCoefficientD2D IE.

New measurement events may be created that trigger a detection report 1611 from the WTRU to the eNB. The WTRU may be configured with D2D-specific events including but not limited to the following: the direct path is higher than an absolute threshold; the direct path is worse than an absolute threshold; the direct path is better than infrastructure path by a threshold.

Some other criteria that may be used to trigger or gate the reporting of D2D measurements or as triggers for mobility decisions are listed below.

The interference level detected in the D2D frequency at a WTRU may also be a criterion. The interference level may be more indicative of the deliverable data capacity than the path loss measure. For example, the RSRQ measured on the potential D2D link may be taken into account. It may also be a two-step criterion such that when RSRQ is below a certain threshold and the RSRP of the actual configured D2D link is above another threshold. The RSRQ threshold may also be configured and reported when a D2D link is established and being used such as when the RSRQ goes above a threshold.

The current mobility state (speed) of the WTRU may also be a criterion. For example, if the WTRU is moving at a high speed switching to D2D links may be delayed. This may avoid frequent switching of links and therefore data loss. However, if both WTRUs in a prospective D2D link are moving at a high speed but consistently report good measurements of the D2D link between them, one implication is that they are traveling in the same direction (maybe together, as in group mobility scenarios), and hence a D2D link may be established between them. Mobility estimation may be based on Doppler measurements, on existing Mobility State Estimation (MSE) algorithms, or as tracked by the network (e.g. by tracking macro mobility).

Alternatively or additionally the WTRU may have a proximity detection configuration, 1610, that is separate from other quality measurements. The WTRU may be configured for reception of signals related to detection of the proximity of another WTRU, also referred to as proximity detection. Alternatively or additionally, the WTRU may be configured with a proximity reporting configuration. Such configuration may include provide the WTRU the capability to determine, upon successful proximity detection, whether or not to trigger a detection report, 1611. This may, for example, be a function of the received signal itself e.g. as a function of the resource in time and/or frequency of the signal or as a function of a signature received in the said signal.

The WTRU may have a list of detection objects corresponding to WTRUs and/or services, which may be indexed using a parameter that may include an identity. Such an identity may correspond to a potential peer WTRU and/or to a D2D session, which may also be referred to as a D2D communication identity. The WTRU may receive control signaling that modifies the activation state of the proximity detection configuration, 1610. For example, such control signaling may be received in a DCI on PDCCH (possibly scrambled by a RNTI applicable for a group of WTRUs e.g. WTRUs that are D2D-capable and/or interested in a specific service), or as a MAC CE, or as RRC signaling. It may also be received on a broadcast or groupcast channel e.g. a channel that would provide information about available D2D sessions in a given area/cell. The control signaling may include the index to the applicable proximity detection object.

The WTRU may trigger a detection report, 1611, if it receives a signal that corresponds to its proximity detection configuration, 1610. For example, the WTRU may trigger a detection report based on the detection configuration, 1611, if it determines that the detected proximity signal corresponds to at least one of a specific signal, WTRU, and/or D2D session. This may be based on including but not limited to the following: a signature received in the signal, an identity, an index determined as a function of the signal and a configured set of resources for proximity detection, a specific session associated with the detected signal such as a session ID, or a type of link associated with the detected signal (e.g. whether the link is with infrastructure support or not).

A proximity detection configuration, 1610, may include but is not limited to the following objects.

A proximity detection object: Such an object may include one or more properties of a signal. For example, this may include at least one of a frequency and/or an index to a resource. The WTRU may use the object configuration to determine where it may attempt proximity detection. For example, the object may include a list of signals and/or identities associated with an identity of a D2D service and/or session.

A proximity reporting configuration: a reporting a configuration may correspond to a list of reporting criteria. For example, this may include but is not limited to an index to a resource (if not provided by the proximity detection object), a WTRU identity, a service identity and/or a direct path type. Such a configuration may additionally include whether or not additional measurements may be required to determine if proximity detection is successful. The WTRU may use the proximity reporting configuration to determine, once detection is successful, whether or not to trigger a detection report based on the detection configuration 1611. Additional criteria may include a periodic or a single event description. Such a configuration may additionally include a reporting format, which may include for example the number of detected signals and/or WTRUs/services to report.

A proximity detection identity may correspond to a list of identities that may link a detection object with a proximity detection configuration 1610. For example, the WTRU may include such an identity in the detection reporting (or possibly also in a measurement report as described herein) such that the network may determine what specific signal is being reported.

Proximity measurement gap configuration: such a configuration may be associated with the detection process. For example, this may be useful for a WTRU that is connected to a macro layer only and/or that does not have a cell configured in the frequency/band of the proximity detection configuration 1610 such that the WTRU may not miss data transfers on the infrastructure path or be required to turn on an additional transceiver chain for the sole purpose of proximity detection.

The WTRU may trigger a proximity detection report, 1611, when an event occurs including but not limited to the following events.

The WTRU may be configured to detect the presence of one or more WTRUs in a given frequency using a proximity detection configuration 1610 and no satisfactory measurements are available, such as when the received signal strength is insufficient and/or the D2D session is not active.

The WTRU may be configured to detect the presence of one or more WTRUs in a given frequency using a proximity detection configuration 1610 and no associated measurement is configured.

When the WTRU trigger a proximity detection report 1611, the WTRU may initiate transmission of an RRC SDU over a SRB of the WTRU's configuration.

The network may respond by configuring a direct path and/or associated reference signals. For the network side, the network node may determine from the reception of a proximity detection report, 1611, whether or not one or more direct paths that correspond to a detected signal should be configured and activated. For example, WTRUs may subsequently receive a configuration for the direct path 1612 and may initiate transmission of additional reference signals that are suitable for radio quality measurements (for example RSRP or similar) to enable further measurements, and/or may initiate a handshake procedure to establish the D2D link in accordance with the methods described herein.

The network may respond by configuring measurements for the direct path and/or associated reference signals according to any other methods described herein. The network node may also determine from the reception of a proximity detection report 1611 whether or not it may instruct to WTRU to perform at least one action including but not limited to the following actions:

Perform a measurement for the direct path (or its corresponding reference signals) that may correspond to the detected signal if they are not already configured for that WTRU and/or if no such measurement report was received with the detection report.

Perform RRC reconfiguration that may configure direct path (and/or its corresponding reference signals) to the WTRU's configuration (for example, if a receive measurement report indicates sufficient radio quality) according to any other methods described herein.

Figure 17A:
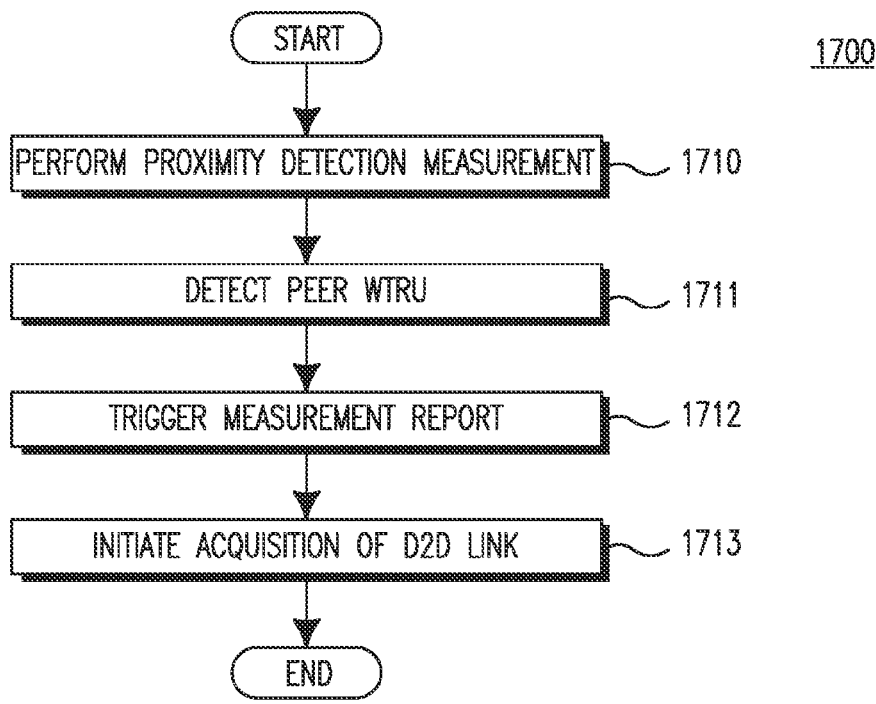
FIG. 17A shows a flow chart of an example for when an inbound mobility trigger may be used for establishing a direct path when sufficient conditions exist.
Figure 17B:
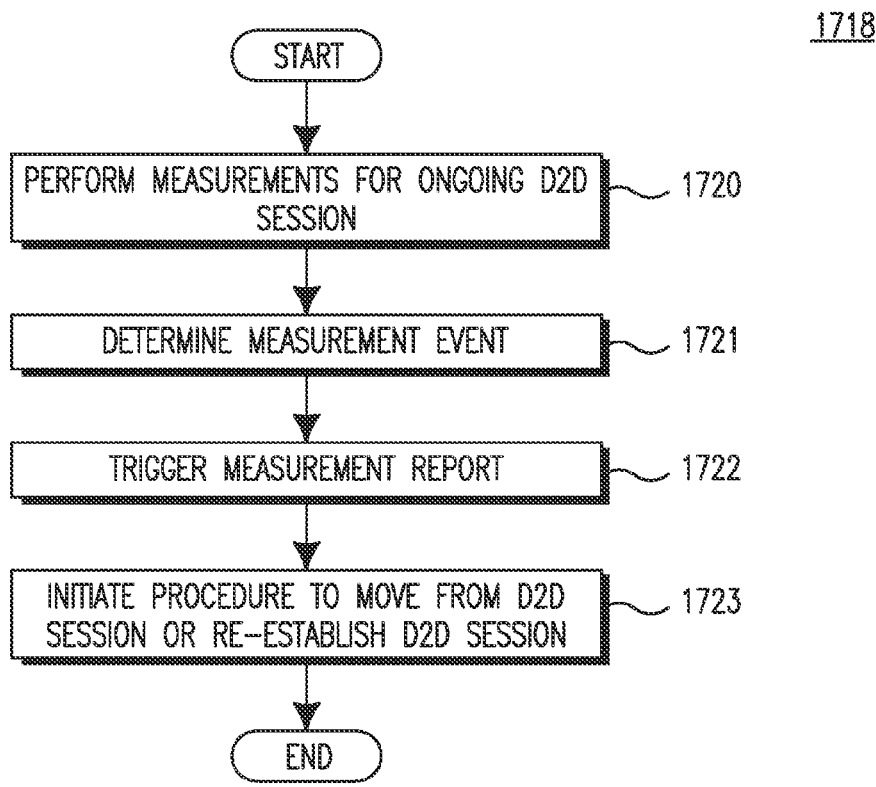
FIG. 17B shows a flow chart of an example for when an outbound mobility trigger may be used for switching from a direct path when insufficient conditions exist.

FIG. 17A-B show flow charts for procedures 1700 and 1718 in which the WTRU may consider proximity detection in combination with measurements for triggers. The WTRU may be configured with one measurement object per D2D session and/or per peer WTRU for the given D2D session. A D2D session may correspond to a single D2D link. A measurement object may include a list of one or more entries where each entry may consist of at least one discovery signal property. There may be one such entry for each possible peer of the measurement object configuration. For example, a D2D-capable WTRU may be interested in establishing or may already be active in a given D2D session. Discovery signal properties may correspond to proximity detection information such as a WTRU identity or signature, a time-domain position and/or a frequency domain position for the discovery signal or the like. Such lists may correspond to a whitelisted set of WTRUs such as a set of WTRUs for a given D2D session. Such configurations may also include information such as the type of service associated to the discovery signal or such as the type of direct path. For example, the configuration may include information corresponding to whether the direct path uses an infrastructure mode or not or alternatively some information regarding the type of reference signals that may be used for RSRP measurements.

FIG. 17A shows a flow chart for when an inbound mobility trigger may be used for establishing a direct path when sufficient conditions exist. For example, the WTRU may start performing a proximity detection measurement, 1710, for a measurement object that includes the D2D measurement extension when the WTRU is interested in establishing a direct path for a corresponding service. This proximity detection measurement, 1710, may be on a received reference signal as described above for example. Alternatively or additionally, it may trigger a measurement report, 1712, for a measurement object that includes the D2D measurement extension when the WTRU is interested in establishing a direct path for a corresponding D2D service. The WTRU may then successfully detect at least one corresponding peer WTRU, 1711, for the D2D service. When a proximity detection measurement, 1710, has been started and the measurement has met a triggering criterion, the WTRU may trigger a measurement report, 1712, such as in case of infrastructure mode. Alternatively or additionally the WTRU may initiate acquisition of the D2D link 1713 to establish D2D communication according to any other methods described herein.

FIG. 17B shows a flow chart for when an outbound mobility trigger may be used for switching from a direct path when insufficient conditions exist. For example, while active on the Direct Path, the WTRU may perform measurements for a measurement object that includes the D2D measurement extension that corresponds to the ongoing D2D session, 1720. In such cases, when the WTRU determines that a measurement event, 1721 occurred (e.g. such as indicating that the quality of the link is below a certain threshold) and triggers a measurement report, 1722, it may no longer successfully detects proximity of at least one other WTRU in the D2D session. In that case, the WTRU may then initiate a procedure to move or handover from the D2D session and/or to re-establish the D2D session, 1723, according to any other methods described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit/receive unit (WTRU), the method comprising:
   receiving, by the WTRU using a long term evolution (LTE) radio access technology (RAT), discovery related configuration information, wherein the discovery related configuration information includes discovery filtering information and information for a non-LTE RAT;
   monitoring, by the WTRU, a device-to-device (D2D) communication interface on the non-LTE RAT based on the discovery filtering information;
   transmitting, by the WTRU using the LTE RAT, a report based on the discovery filtering information, wherein the report includes information associated with the discovery filtering information;
   receiving, by the WTRU using the LTE RAT, a message to allow the WTRU to establish a D2D communication link with another WTRU using the non-LTE RAT; and
   communicating, by the WTRU using the non-LTE RAT, on the D2D communication link with the another WTRU based on the received message.

2. The method of claim 1, further comprising:
   triggering, by the WTRU, a measurement report to an eNB.

3. The method of claim 1, further comprising:
   receiving, by the WTRU, a proximity detection configuration from an eNB.

4. The method of claim 1, wherein the D2D communication link is further based on receiving at least one Radio Resource Control (RRC) Connection Reconfiguration message from an eNB.

5. The method of claim 1, further comprising:
   detecting, by the WTRU, that at least one discovery signal property is below a threshold; and
   initiating, by the WTRU, a handover to an infrastructure path.

6. The method of claim 1, further comprising:

receiving, by the WTRU, a security configuration for D2D communication;

determining, by the WTRU, security parameters applicable to the D2D communication; and activating, by the WTRU, security for the D2D communication.

7. A wireless transmit/receive unit (WTRU) comprising:

a receiver configured to receive, using a long term evolution (LTE) radio access technology (RAT), discovery related configuration information, wherein the discovery related configuration information includes discovery filtering information and information for a non-LTE RAT;

the receiver configured to monitor a device-to-device (D2D) communication interface on the non-LTE RAT based on the discovery filtering information;

a transmitter configured to transmit, using the LTE RAT, a report based on the discovery filtering information, wherein the report includes information associated with the discovery filtering information;

the receiver configured to receive, using the LTE RAT, a message to allow the WTRU to establish a D2D communication link with another WTRU using the non-LTE RAT; and the WTRU configured to communicate, using the non-LTE RAT, on the D2D communication link with the another WTRU based on the received message.

8. The WTRU of claim 7, further comprising:

the transmitter further configured to trigger a measurement report to an eNB.

9. The WTRU of claim 7, further comprising:

the receiver further configured to receive a proximity detection configuration from an eNB.

10. The WTRU of claim 7, wherein the D2D communication link is further based on receiving at least one Radio Resource Control (RRC) Connection Reconfiguration message from an eNB.

11. The WTRU of claim 7, further comprising:

the receiver further configured to detect that at least one discovery signal property is below a threshold; and the WTRU further configured to initiate a handover to an infrastructure path.

12. The WTRU of claim 7, further comprising:

the receiver further configured to receive a security configuration for D2D communication;

a processor configured to determine security parameters applicable to the D2D communication; and the processor further configured to activate security for the D2D communication.

* * * * *